US 6,581,004 B2

(12) United States Patent
Mori et al.

(10) Patent No.: US 6,581,004 B2
(45) Date of Patent: Jun. 17, 2003

(54) ROUTE NAVIGATION SYSTEM, CLIENT TERMINAL, SERVER, ROUTE NAVIGATION METHOD, AND ROUTE IDENTICALNESS DETERMINATION METHOD

(75) Inventors: Kenji Mori, Toyota (JP); Masayuki Yurimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/119,154

(22) Filed: Apr. 10, 2002

(65) Prior Publication Data

US 2002/0161519 A1 Oct. 31, 2002

(30) Foreign Application Priority Data

Apr. 26, 2001 (JP) ........................................ 2001-130447
Mar. 5, 2002 (JP) ........................................ 2002-059525

(51) Int. Cl.[7] .............................................. G01C 21/30
(52) U.S. Cl. ..................... 701/209; 701/201; 701/202; 701/208; 701/210; 340/990; 340/995
(58) Field of Search ................................ 701/200, 201, 701/202, 207, 208, 209, 211, 210; 340/988, 990, 995

(56) References Cited

U.S. PATENT DOCUMENTS 6,292,743 B1 * 9/2001 Pu et al. ...................... 701/202

FOREIGN PATENT DOCUMENTS

JP    A 2000-18955    1/2000

OTHER PUBLICATIONS

U.S. patent application Ser. No. 09/704,665, Tada et al., filed Nov. 3, 2000.
U.S. patent application Ser. No. 09/705,711, Tada et al., filed Nov. 6, 2000.
U.S. patent application Ser. No. 09/708,484, Tada et al., filed Nov. 9, 2000.

* cited by examiner

Primary Examiner—Gertrude Arthur
(74) Attorney, Agent, or Firm—Oliff & Berridge PLC

(57) ABSTRACT

A server in an information base determines a route (server route) from a place of departure to a destination, transmitted from a client terminal of a navigation unit via communication, using information in a server database. On the other hand, the client terminal determines a route (client route) from the place of departure to the destination using information in a client terminal database. Either the server or the client terminal determines whether or not the server route and the client route are identical based on information concerning guiding points of each route, and the client terminal then performs route navigation of a route in a section where the routes are identical using the information in the client terminal database and a route in a non-identical section where the routes are not identical using the information in the server database. In this way, the information in the client terminal database is effectively used in the route navigation and thereby an amount of information to be transmitted to the client terminal from the server is decreased.

36 Claims, 23 Drawing Sheets

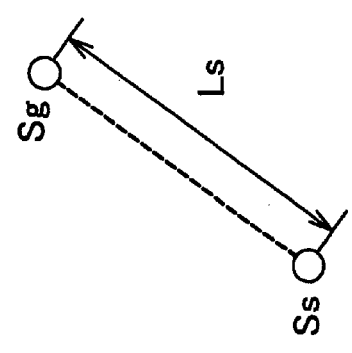
FIG. 11A SERVER ROUTE
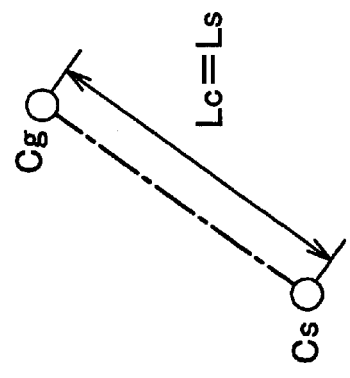
FIG. 11B CLIENT ROUTE
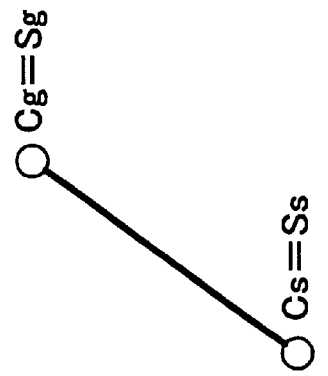
FIG. 11C USABLE CLIENT ROUTE

CLIENT ROUTE

SERVER ROUTE

FIG. 13A SERVER ROUTE

FIG. 13B CLIENT ROUTE

FIG. 13C

FIG. 14A  SERVER ROUTE

FIG. 14B  CLIENT ROUTE

FIG. 15A SERVER ROUTE
FIG. 15B CLIENT ROUTE
FIG. 15C

ROUTE NAVIGATION SYSTEM, CLIENT TERMINAL, SERVER, ROUTE NAVIGATION METHOD, AND ROUTE IDENTICALNESS DETERMINATION METHOD

INCORPORATION BY REFERENCE

The disclosure of Japanese Patent Applications No. 2001-130447 filed on Apr. 26, 2001 and No. 2002-59525 filed on Mar. 5, 2002, including the specification, drawings and abstract is incorporated herein by reference in its entirety.

BACKGROUND OF THE INVENTION

1. Field of Invention

The invention relates to a route navigation system, a client terminal, a server, a route navigation method, and a route identicalness determination method for performing route navigation for a user of the client terminal from a place of departure to a destination, through communication between the server at an information base and the client terminal.

2. Description of Related Art

Among the conventional route navigation systems that have been proposed, there is a navigation system in which a route navigation apparatus (client terminal) such as a navigation apparatus mounted in a vehicle carries out transmission and reception of information (data) to/from an information base (server), and thereby supplements data in the route navigation apparatus in order to properly perform route navigation from a place of departure P to a destination G. However, such a route navigation system involves a problem in that the amount of information (data) to be transmitted from the information base to the route navigation apparatus becomes large and communication cost is accordingly increased.

In view of such a problem, Japanese Laid-Open Patent No. 2000-18955 discloses a system in which the information base only transmits information concerning a route that a user has not traveled in the past to a route navigation apparatus, but does not transmit information concerning a route that the user has previously traveled to the route navigation apparatus to thereby decrease the amount of the information to be transmitted.

However, the above-described system has a problem in that the information base, even in the case where substantially the same information concerning the route is stored in the route navigation apparatus, transmits the information of the entire route to the route navigation apparatus if the entire route has never been traveled by the user, thus resulting in a problem in that the amount of the data to be transmitted is not sufficiently decreased.

SUMMARY OF THE INVENTION

One of the objects of the invention is achieved by a route navigation system, a client terminal, a server, a route navigation method, and a route identicalness determination method which decrease the amount of data to be transmitted from an information base to a route navigation apparatus (client terminal) through an effective use of data stored in the route navigation apparatus.

In a general description of the invention to be given below, a route navigation system provided with a server and a client terminal will be described as a typical example, and the description of the route navigation system will substitute for descriptions of the server and the client terminal, both of which are components of this route navigation system, a route navigation method which is an operating method of the route navigation system, and the route identicalness determination method according to the invention.

A route navigation system according to one aspect of the invention, which performs route navigation for a user of the client terminal from a place of departure to a destination, is constituted from:

a server including a server database, which determines a server route which is a route from the place of departure to the destination along with guiding points, using information in the server database; and a client terminal, including a client terminal database, which, communicating with the server, determines a client route which is a route from the place of departure to the destination, along with guiding points, using information in the client terminal database.

The server or the client terminal determines whether or not a route between adjoining guiding points of the server route and a route between adjoining guiding points of the client route are identical by at least comparing positions of the guiding points of the server route and the client route. Then, the client terminal, based on a result of the above determination, selectively uses information concerning the client route in the client terminal database and information concerning the server route in the server database in performing the route navigation. At this point, it should be noted that physically separate servers may be used for determining the server route and for making the above-described comparative determination, which are respectively constructed from physically separate computers which are connected to and communicate with one another.

The server determines the server route which is a route from the place of departure to the destination using the information (data) in the server database which is its own database, and the server route includes the guiding points. On the other hand, the client terminal determines the client route, which is a route from the place of departure to the destination, using the information (data) in the client terminal database which is its own database, and the client route also includes the guiding points.

Next, in the above-described comparative determination by the server or the client terminal, the positions of the guiding points of the server route and the client route are compared to each other, and, based on a result thereof, it is determined whether or not the route between the adjoining guiding points of the server route and the route between the adjoining guiding points of the client route are identical. Then, according to the result thereof, the information in the server and the client terminal are selectively used in performing the route navigation.

In this way, at least when the guiding points of the server route and the client routes are identical, and therefore it is determined that the route between the adjoining guiding points of the server route and the route between the adjoining guiding points of the client route are substantially the same, the information concerning the client route in the client terminal database is effectively used and thereby it becomes possible to decrease the amount of the data (information) concerning the server route to be transmitted to the client terminal from the server.

Further, a route navigation system according to one embodiment of the invention is a route navigation system which performs route navigation for a user of the client terminal from a place of departure to a destination, including:

a server including a server database, which determines a server route which is a route from the place of departure to the destination using the information in the server database; and a client terminal including a client terminal database which, communicating with the server, performs the route navigation based on the information in the client terminal database and the information in the server database, in which the client terminal obtains guiding point information (information concerning guiding points) of the determined server route and, taking one of adjoining guiding points of the server route specified in the obtained information as the outgoing-side guiding point and the other one of those adjoining guiding points as the incoming-side guiding point, determines a client route therebetween using the information in the client terminal database, and the client terminal determines whether or not the server route between the adjoining guiding points and the determined client route are identical, and if they are identical, performs the route navigation of the route between the adjoining guiding points using the information in the client terminal database, and if they are not identical, obtains the information concerning one or more sections or entire sections of the server route between the adjoining guiding points from the server and performs the route navigation based thereon.

As described above, the server determines the server route which is a route from the place of departure to the destination, using the information in the server database. This route includes the guiding points. On the other hand, the client terminal obtains the guiding point information of the server route from the server and, using the information in the client terminal database, determines the client route between the adjoining guiding points specified in the guiding point information obtained from the server, taking one of those adjoining guiding points as the outgoing-side guiding point and the other one of those as the incoming-side guiding point.

The client terminal thereafter determines whether or not the server route between the adjoining guiding points and the determined client route are identical. if they are identical, the client terminal performs the route navigation of the route between the adjoining guiding points using the information in the client terminal database. If they are not identical, the client terminal obtains the information concerning one or more sections or entire sections of the server route between the adjoining guiding points from the server and performs the route navigation based thereon. The information concerning one or more sections or entire sections of the server route between the adjoining guiding points may be minimal information which is necessary for performing the route navigation, but also may be map data for surrounding areas of the route between the adjoining guiding points, including the above minimal information.

Accordingly, the information in the client terminal database is at least used for performing the route navigation of the route in the section where the server route between the adjoining guiding points and the determined client route are identical. Thus, it is not necessary to transmit the information concerning the server route in those sections to the client terminal from the server and therefore the amount of the information to be transmitted from the server to the client terminal is decreased. Further, since the client terminal determines the client route to each adjoining guiding point of the server route, compared to the case where the client route is determined for the entire route from the place of departure to the destination at once using the information in the client terminal database, the compared portions of the server route and the client route are more likely to be identical. Also in this viewpoint, the amount of the information to be transmitted to the client terminal from the server is decreased in the above-described construction.

According to a further aspect of the invention, there is provided a route navigation system that performs a communication between a server having a server-side database and a client terminal having a client terminal-side database, and performs a route navigation from a place of departure to a destination for a user of the client terminal while selectively using information from the server-side database and information from the client terminal-side database in the route navigation system, the client terminal transmits at least information for specifying the place of departure and the destination to the server, obtains a point that can be a first guiding point that is a guiding point adjacent to the place of departure as a first guiding candidate point by searching information stored in the client terminal-side database. The server obtains a server route that is a route from the place of departure to the destination using information stored in the server-side database based on the information for specifying the place of departure and the destination which information is transmitted from the client terminal, and transmits information regarding a guiding point included in the server route obtained to the client terminal. The client terminal further receives information regarding the guiding point of the server route obtained, determines whether the first guiding candidate point includes a point identical to the first guiding point specified by the received information regarding the guiding point of the server route, performs the route navigation regarding a segment from the place of departure to the first guiding point using the information stored in the client terminal-side database if there is a first guiding candidate point identical to the first guiding point, and performs the route navigation by acquiring information regarding a segment from the place of departure to the first guiding point from the server if there is not a first guiding candidate point identical to the first guiding point.

In this route navigation system, the client terminal transmits at least information for specifying a place of departure and a destination to the server, and obtains a point that can be a first guiding point that is a guiding point adjacent to the place of departure as a first guiding candidate point by searching information stored in the client terminal-side database. The place of departure is known to the client terminal. Therefore, the client terminal is able to obtain first guiding candidate points through the use of only information stored in the client-side database. In other words, the client terminal is able to start an operation of obtaining first guiding candidate points at a stage preceding acquisition of information from the server.

On the other hand, the server obtains a server route that is a route from the place of departure to the destination through the use of information stored in the server-side database based on the information from the client terminal for specifying the place of departure and the destination. To obtain such a route, in general, a process termed "route calculation" which is more complicated and requires more time than a simple data search is needed. Therefore, during the course of the server obtaining a server route, the client terminal starts search of first guiding candidate points, and therefore can finish the entire search or can finish at least a portion of the search.

Furthermore, after the server obtains a server route, the client terminal receives information regarding guiding points of the server route, and determines whether the first guiding candidate points include a point identical to the first guiding point (first guiding point on the server route) specified by the acquired information regarding the guiding points of the server route.

If there is a first guiding candidate point identical to the first guiding point of the server route, the client terminal performs the route navigation regarding the segment from the place of departure to the first guiding point (i.e., the identical first guiding candidate point) through the use of information stored in the client terminal-side database. If there is not a first guiding candidate point identical to the first guiding point of the server route, the client terminal performs the route navigation by acquiring information regarding a segment from the place of departure to the first guiding point from the server.

Thus, since the client terminal starts search regarding first guiding candidate points during the process of the server obtaining a server route, the client terminal is able to finish the entire search of first guiding candidate points or finish at least a portion of the search by the time of receiving information regarding guiding points on the server route. Therefore, within a short time before the time point of reception, the client terminal is able to determine which one of the client terminal-side database and the server-side database stores information to be used for the segment from the place of departure to the first guiding point, within a short time before the time of receiving the information. Therefore, the client is able to quickly acquire at least information regarding the first guiding point within a short time period following a request for route navigation (i.e., following a departure of the vehicle). Hence, route navigation appropriate to a user can be performed. Furthermore, if a first guiding candidate point identical to the first guiding point on the server route exists and information stored in the client terminal-side database can be used, information regarding the segment related to the first guiding point is not transmitted. Therefore, only information for specifying the guiding points on the server route is transmitted, so that the amount of information transmitted can be reduced.

According to a further aspect of the invention, there is provided a route navigation system that performs a communication between a server having a server-side database and a client terminal having a client terminal-side database, and performs a route navigation from a place of departure to a destination for a user of the client terminal while selectively using information from the server-side database and information from the client terminal-side database. In the route navigation system, the client terminal transmits at least information for specifying the place of departure and the destination to the serve. The server obtains a server route that is a route from the place of departure to the destination using information stored in the server-side database based on the information for specifying the place of departure and the destination which information is transmitted from the client terminal, and transmits guiding point information regarding a guiding point included in the server route obtained to the client terminal. The client terminal further acquires the guiding point information of the server route from the server, and for obtaining a point that can be an adjacent guiding point that is a guiding point adjacent to an arbitrary guiding point of guiding points specified by the acquired guiding point information, at a destination side of the arbitrary guiding point, as an adjacent guiding candidate point by searching information stored in a client terminal-side database, determines whether the adjacent guiding candidate point includes a point identical to an adjacent guiding point of the server route which is a guiding point adjacent to the destination side of the arbitrary guiding point and which is specified by the acquired guiding point information, performs the route navigation regarding a segment from the arbitrary guiding point to the adjacent guiding point of the server route using the information stored in the client terminal-side database if there is an adjacent guiding candidate point identical to the adjacent guiding point of the server route, and performs the route navigation by acquiring information regarding a segment from the arbitrary guiding point to the adjacent guiding point of the server route from the server if there is not an adjacent guiding candidate point identical to the adjacent guiding point of the server route.

In this route navigation system, the client terminal transmits at least information for specifying a place of departure and a destination to the server. The server obtains a server route that is a route from the place of departure to the destination through the use of information stored in the server-side database based on the information from the client terminal for specifying the place of departure and the destination. To obtain such a route, in general, a process termed "route calculation" which is more complicated and requires more time than a simple data search is needed. Then, the server transmits guiding point information regarding guiding points included in the obtained server route to the client terminal.

On the other hand, the client terminal receives the information regarding guiding points of the obtained server route, and obtains a point that can be an adjacent guiding point that is a guiding point adjacent to an arbitrary guiding point of guiding points specified by the received guiding point information, at a destination side of the arbitrary guiding point, as an adjacent guiding candidate point by searching information stored in the client terminal-side database. Since this process is a data searching process, it is often the case that the process ends in a shorter time than a calculation of a route between adjacent guiding points.

Then, the client terminal determines whether the adjacent guiding candidate points include a point identical to an adjacent guiding point of the server route which is specified by the received guiding point information. In accordance with the result of the determination, the client terminal performs the route navigation regarding the segment from the arbitrary guiding point to the adjacent guiding point of the server route either by using information stored in the client terminal-side database, or by acquiring information regarding the segment from the server and using the acquired information.

Therefore, the client terminal is able to determine route information to be used, and is able to acquire the information, through simple data search without performing a route calculation that has a great calculation load and needs a relatively long time. Therefore, it becomes possible to quickly perform route navigation at precise timing.

BRIEF DESCRIPTION OF THE DRAWINGS

The above and other objects, features, advantages, technical and industrial significance of this invention will be better understood by reading the following detailed description of preferred embodiments of the invention, when considered in connection with the accompanying drawings, in which:

FIG. 11A is a drawing which shows the server route;

FIG. 11B is a drawing which shows the client route;

FIG. 11C is a drawing which shows the usable sections of the client route;

FIG. 13A is a drawing which shows the server route;

FIG. 13B is a drawing which shows the client route;

FIG. 13C is a drawing which shows the usable sections of the client route and the remaining sections of the server route, data of which has been transferred;

FIG. 14A is a drawing which shows the server route;

FIG. 14B is a drawing which shows the client route;

FIG. 15A is a drawing which shows the server route;

FIG. 15B is a drawing which shows the client route;

FIG. 15C is a drawing which shows the server route, data of which has been transferred;

DETAILED DESCRIPTION OF PREFERRED EMBODIMENTS

In the following description and the accompanying drawings, the present invention will be described in more detail in terms of preferred, exemplary embodiments.

Hereafter a description will be given for a route navigation system according to embodiments of the invention with reference to the figures. A route navigation system according to a first embodiment, a general structure of which is shown in FIG. 1, executes an algorithm called "route merging algorithm" in performing route navigation and includes, in a construction thereof, a navigation unit 10, which is mounted in each vehicle and works as a route navigation apparatus, and a computer in an information base 20.

Figure 2:
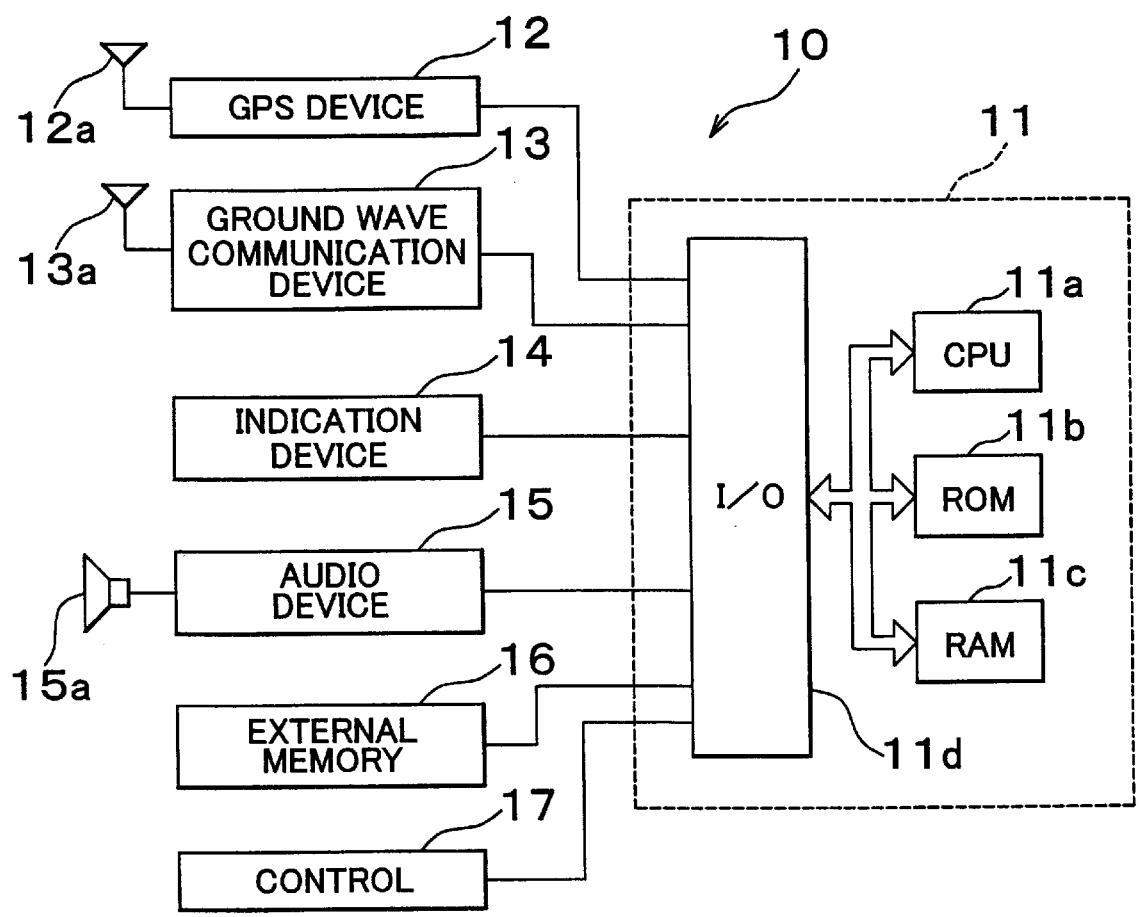
FIG. 2 is a block diagram of a navigation unit (client terminal) shown in FIG. 1.

The navigation unit 10, as shown in FIG. 2, includes a micro computer 11 as a main component thereof, which is provided with a CPU 11a, a ROM 11b, a RAM 11c, and an input/output interface 11d, all mutually connected via a bus. The CPU 11a executes a program (routine), to be described later, stored in the ROM 11b, utilizing a data storage function of the RAM 11c. Here the navigation unit 10 is also called "client terminal 10" or "mobile terminal 10" and the computer 11 is simply called "client."

The navigation unit 10 further includes a GPS device 12, a ground wave communication device 13, an indication device 14, an audio device 15, an external memory 16, and a control 17, all connected to the input/output interface lid so as to send/receive a signal to/from the CPU 11a.

Figure 1:
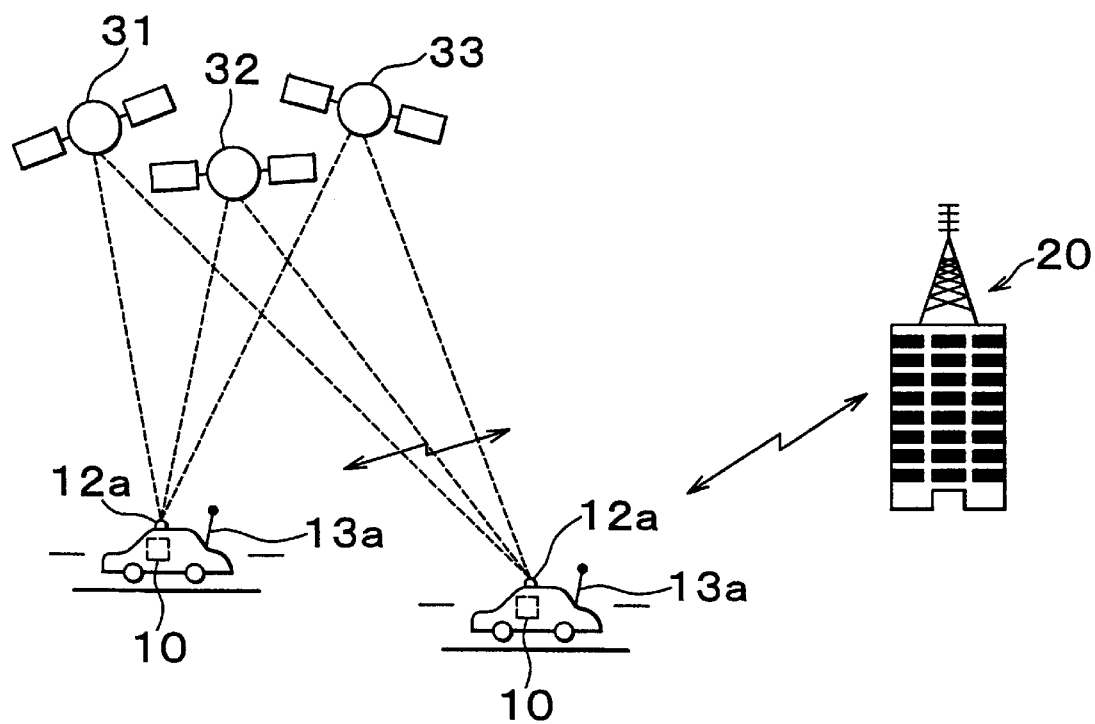
FIG. 1 is a general structural drawing of a route navigation system according to a first embodiment of the invention.

The GPS device 12, connected to an antenna 12a which receives a GPS signal from GPS satellites 31, 32, and 33 shown in FIG. 1, determines a vehicle position of a vehicle (vehicle position P) based on the GPS signal to be received at specified time intervals via the antenna 12a, and transmits data concerning the thus determined vehicle position P to the microcomputer 11.

The ground wave communication device 13, connected to an antenna 13a which is an antenna for receiving ground waves, receives a radio signal from the information base 20 shown in FIG. 1, and transmits specified information to the information base 20 according to an instruction of the microcomputer 11. The indication device 14, including a display (not shown in the figures), indicates information such as map information and the like according to an instruction signal from the microcomputer 11. The audio device, connected to a speaker 15a, generates a sound according to the instruction signal from the microcomputer 11.

The external memory 16 is constructed from a hard drive, a MO drive or the like and a database (client terminal database) is provided therein. The database stores data such as map data containing route data, programs and the like, and feeds the data and the like to the microcomputer 11 and stores information according to the instruction of the CPU 11a. The control 17, including control switches, enables input of a destination G and instructions such as a selection of the route and the like.

Being thus constructed, when the destination G is input by the user of the vehicle (navigation unit 10), the navigation unit 10 in each vehicle transmits information concerning the destination G, an ID code (hereinafter referred to as "vehicle ID"), which identifies the vehicle, and the vehicle position P of the vehicle to the information base 20. Further, the navigation unit 10, when performing the route navigation, sends/receives various information, to be described later in detail, to/from the information base 20 (information communication) for properly performing the route navigation.

Figure 3:
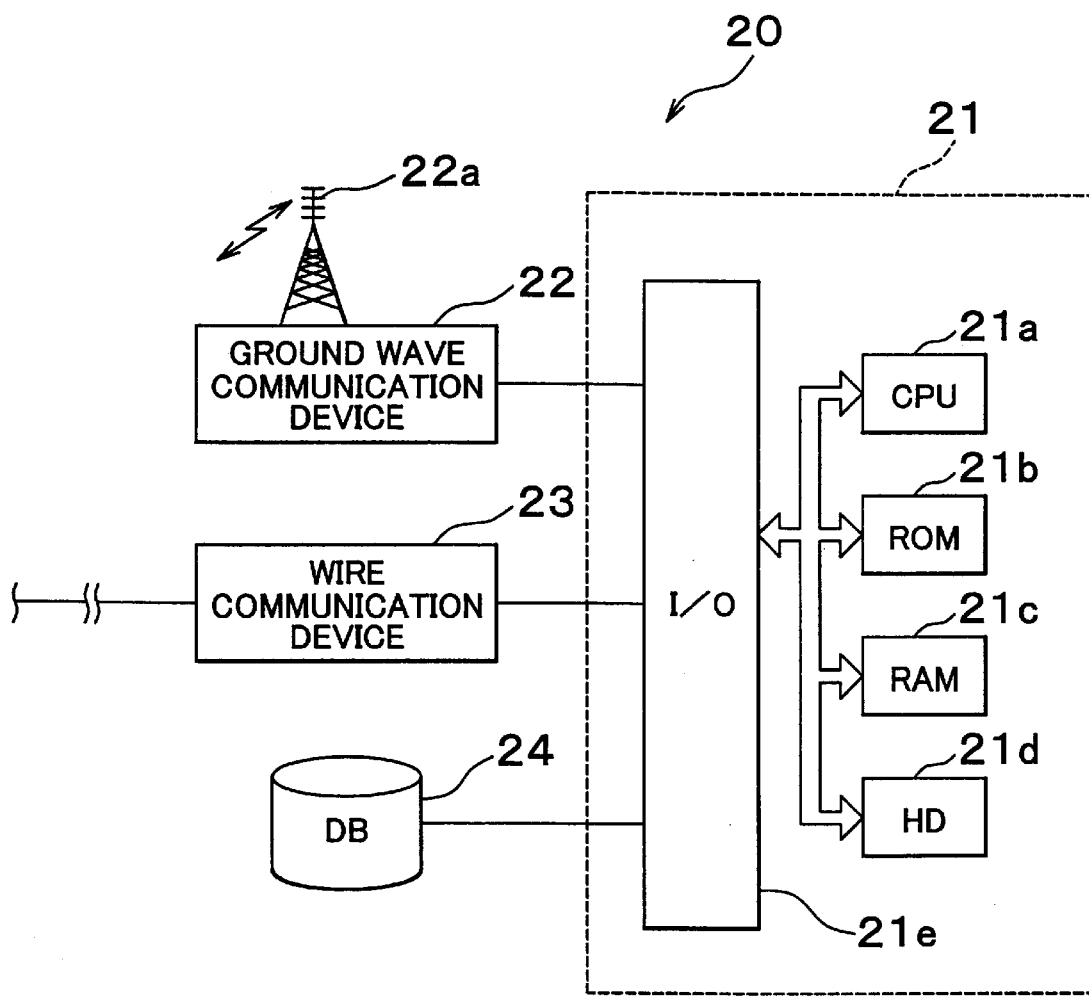
FIG. 3 is a block diagram of a computer in an information base shown in FIG. 1.

The information base 20 is provided with a computer 21 shown in FIG. 3. The computer 21 includes a CPU 21a, a ROM 21b, a RAM 21c, a hard drive 21d, and an input/output interface 21e, all mutually connected via a bus. Here the computer 21 is also called "server."

The CPU 21a executes a program (routine), to be described later, stored in the ROM 21b or the hard drive 21d, utilizing the data storage function of the RAM 21c. The CPU 21a is connected to a ground wave communication device 22, a wire communication device 23, and a database 24 via the input/output interface 21e.

The ground wave communication device 22, provided with an antenna 22a, receives a signal from the navigation unit 10 in the vehicle via the antenna 22a and feeds the received signal to the computer 21, and transmits the information concerning the route to the navigation unit 10 according to the instruction of the computer 21. The wire communication device 23 is connected to other information bases (not shown in the figures) such as a weather information base and the like, and receives information therefrom and feeds the received information to the computer 21 according to the instruction of the computer 21.

The database (server database) 24 is an external readable/writable data storage device and stores data such as updated map information, updated traffic information (wide area) and the like. The map information contains data such as data used for route calculation (route determination), as well as data concerning a form of a road, shops and buildings in surrounding areas or the like. The data for the route calculation contains a road number Rn, which is a road number assigned to a road x, a form of the road x, a node nn which is a node indicating a point of each end of the road x, position of the node nn (latitude x, longitude y, altitude z), a distance LX of the road x (distance between adjoining nodes nn), a kind of the road x (highway, toll road, national road, prefectural road, ordinary road), a property of the road x (e.g., name of highway, road number of a national road, etc.) and the like. Incidentally, the term "type of road" includes kinds of roads, such as highways, national roads, prefectural roads, etc., and properties of roads in a kind of road, such as a national road No. 1, a national road No. 2, etc.

Next, an operation of the route navigation system will hereafter be described. When the user of the vehicle inputs the destination G to the navigation unit 10, the computer 11 of the navigation unit 10, which is the client in other words, executes a client operation routine shown in a flowchart in FIG. 4. On the other hand, the computer 21 in the information base 20, which is the server in other words, repeatedly executes a server operation routine shown in a flowchart in FIG. 5 at specified time intervals.

When the user requests for a route navigation to the destination G and inputs the destination G to the navigation unit 10, the client starts an operation from Step 400 and proceeds to Step 405, therein transmitting the data concerning the vehicle ID for identifying the vehicle, the place of departure P which is a vehicle position of the vehicle, and the destination G to the server.

The client then proceeds to Step 410 and calculates (determines) a route from the place of departure P to the destination G based on the place of departure P, the destination G, and the data in the client terminal database 16. Hereinafter, a route to be determined by the client using the client terminal database is called "client route."

A concrete description will hereafter be given for the calculation (determination) of the route. The client selects a route between a node nP which is a node closest to the place of departure P and a node nG which is a node closest to the destination G. At this time, the client, for example, selects a specified number of routes between the nodes nP and nG in ascending order of distance starting from the shortest. Then an index value Cost for each route is calculated by the following equation.

$$\text{Cost} = [Li \times f(Ri) + g\{n(Ri, Rj)\}] \tag{1}$$

Li is a distance of a road Ri, and f(Ri) is a specified value to be determined according to road type Ri. The road type is, for example, classification of road such as high way, toll road, national road, prefectural road, other ordinary road and the like. f(Ri) is a value which, for example, becomes smallest when the road type is highway, and gradually increases in order of toll road, national road, prefectural road, and other ordinary road. $g\{n(Ri, Rj)\}$ is a specified value to be determined according to an operating load (turn, curving degree) at the time of passing through a node n(Ri, Rj) at which the road Ri and a road Rj are linked. The operating load at the time of passing through the node n is a change in a traveling direction which is necessary for moving from the road Ri to the road Rj, and $g\{n(Ri, Rj)\}$, according to difficulty of driving, becomes, for example, largest for U-turn and gradually decreases in order of right-tun, left-turn, and straight, and the like. Thus, in this embodiment, the index value Cost is calculated so as to become large in proportion to a time to reach the destination, and the client determines a route which gives the smallest index value Cost as the client route. The above-described route determining method is only one example, and is not intended to limit the invention.

Figures 6A, 6B, 6C, 6D:
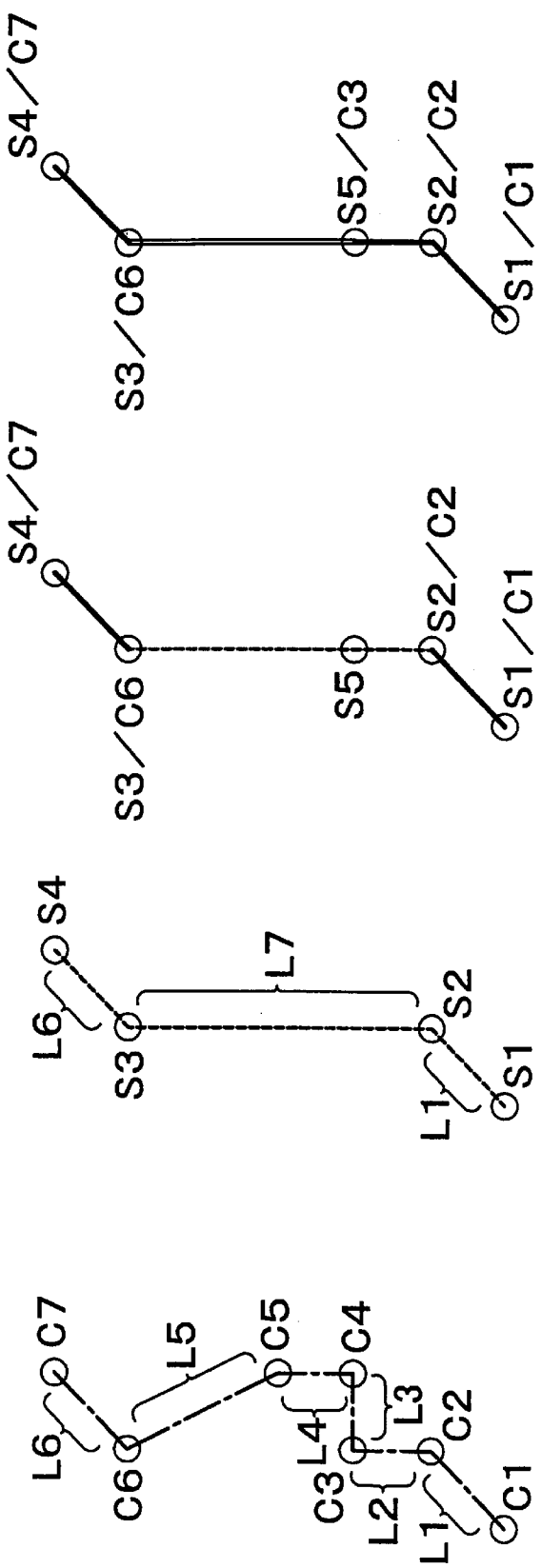
FIG. 6A is a drawing which shows a client route.
FIG. 6B is a drawing which shows a server route.
FIG. 6C is a drawing which shows usable sections of the client route and remaining sections of the server route.
FIG. 6D is a drawing which shows extended usable sections of the client route and the server route, data of which has been transferred.
Figure 7:
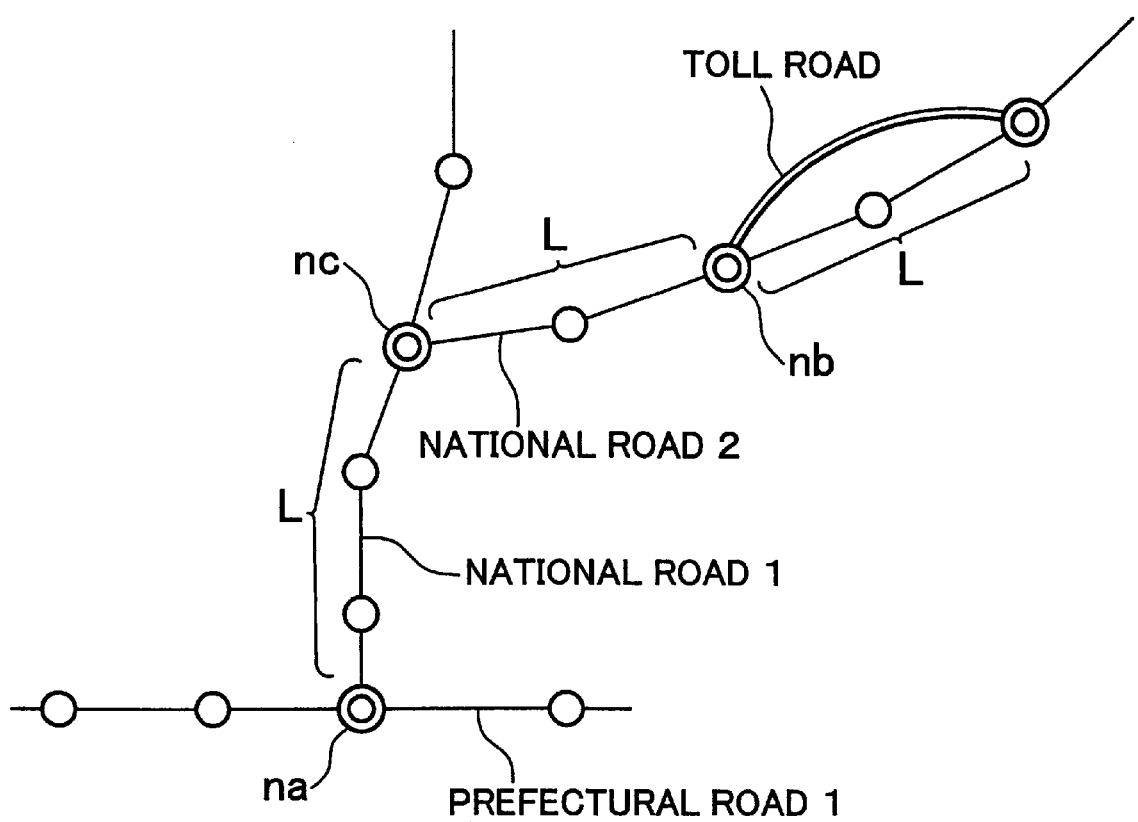
FIG. 7 is a conceptual diagram for explaining guiding points.

FIG. 6A shows one example of the client route to be determined in the above-described manner. In this example, points C1 through C7 are guiding points. Each guiding point, as shown in FIG. 7, is a node (point) at which a guidance needs to be given to the user, such as nodes na and nb at which the road type changes from a prefectural road 1 to a national road 1 or from a national road 2 to a toll road, or a node nc at which the road type does not change but the property of road changes from a national road 1 to a national road 2.

Next, the client proceeds to Step 415 and determines whether or not the guiding point information of the server route has been received. If it has not been received, the client repeats Step 415. The server route is a route which is determined by the server using the server database 24 in the same method as the determination of the client route described above.

Figure 5:
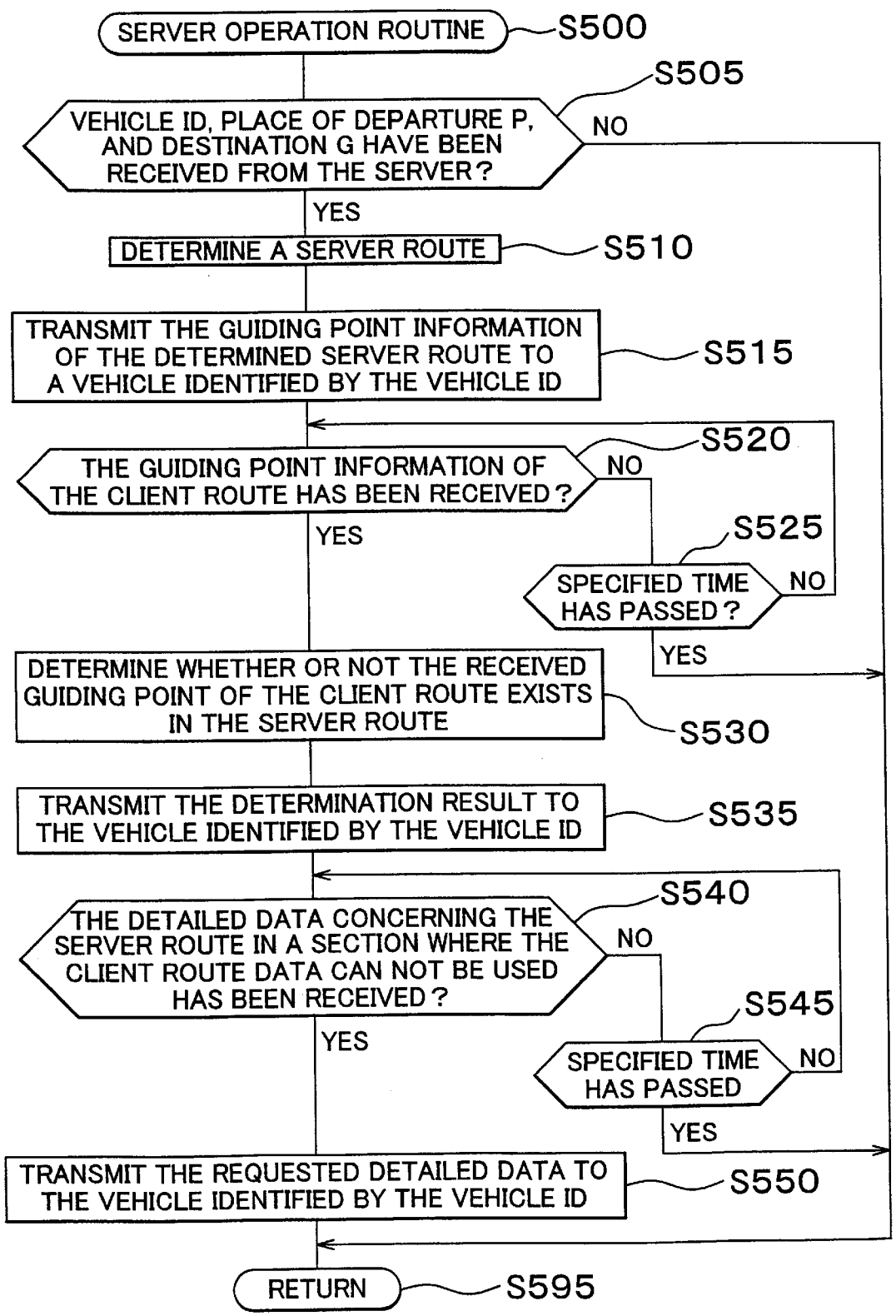
FIG. 5 is a flowchart of a routine to be executed be a server shown in FIG. 3.

On the other hand, the server proceeds to Step 505 from Step 500 shown in FIG. 5 at a specified timing and determines whether or not the information concerning the vehicle ID, the place of departure P, and the destination G have been received. If the information concerning any one of those has not been received from any vehicle, the server determines "NO" in Step 505 and proceeds to Step 595, thus repeatedly carrying out an operation for once finishing the routine.

Figure 8:
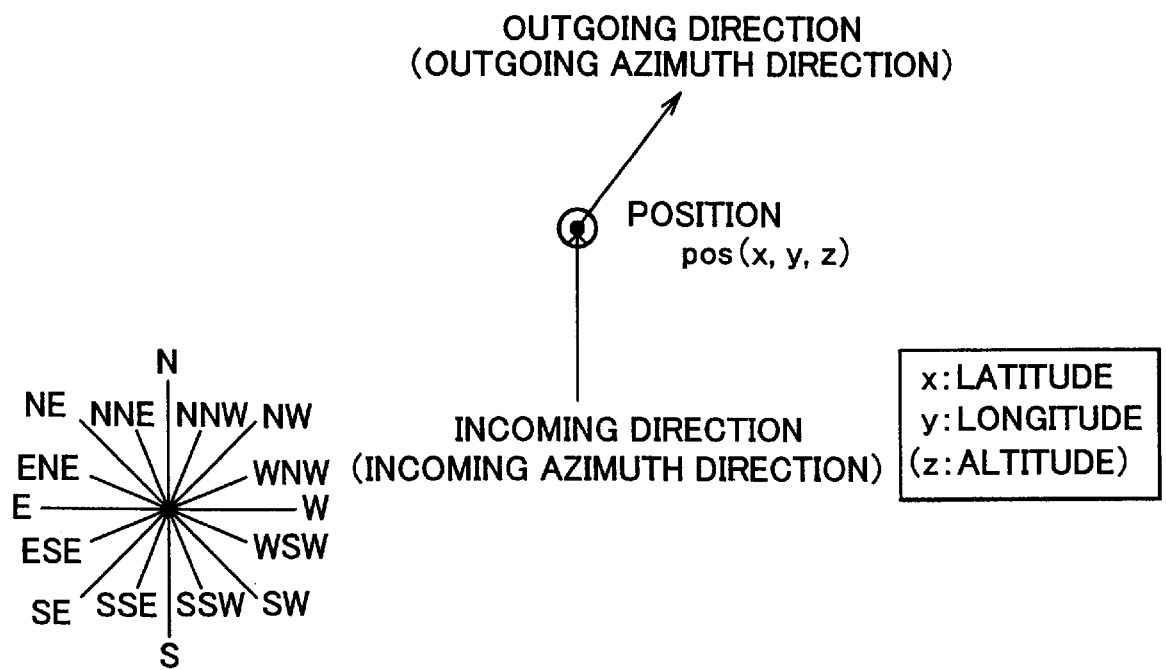
FIG. 8 is a conceptual diagram for explaining guiding point information.

In this routine, when the user inputs the destination G to the client, the information concerning the vehicle ID, the place of departure P, and the destination G are transmitted to the server. Then the server, receiving the information, determines "YES" in Step 505 and proceeds to Step 510 to determine the server route from the place of departure P to the destination G. FIG. 6B shows one example of the server route determined as described above. In this example, points S1 through S4 are the guiding points. Next, in Step 515, the server transmits the guiding points information of the server route determined as described above to a vehicle identified by the vehicle ID received in Step 505. The guiding point information, as shown in FIG. 8, consists of information concerning position POS which is a position of the node n (longitude x, latitude y, altitude z), information concerning an incoming direction (incoming azimuth direction) to the node n and an outgoing direction (outgoing azimuth direction) from the node n, and information concerning a distance L which is a distance between the adjoining guiding points shown in FIG. 7.

If the guiding point information has been transmitted to the client from the server, the client determines "YES" in Step 415, and proceeds to Step 420 and compares the guiding points of the client route and the server route to determine guiding points which are identical between the server route and the client route.

For determining such identical guiding points, the client determines whether or not arbitrary adjoining guiding points of the server route and the client route are identical by examining identicalness (sameness) of the position POS (x, y, z) of each guiding point (node n), the incoming direction and outgoing direction to/from each guiding point, and the distance L between the adjoining guiding points. If all of them are identical (or substantially identical), the client determines that the adjoining guiding points of the client route are identical with the corresponding adjoining guiding points of the server route, and the client route data concerning the client route between the adjoining guiding points (information in the client terminal database 16 concerning the client route) is usable.

In the example shown in FIGS. 6A–D, C1 is identical with S1 (place departure P) (C1=S1), and C2 is identical with S2 (C2=S2), and C6 is identical with S3 (C6=S3), and C7 is identical with S4 (destination G) (C7=S4). Hence the information concerning the client route between the adjoining guiding points is determined as being usable (refer to the continuous line segment in FIG. 6C).

The client then proceeds to Step 425 and transmits the guiding point information of guiding points at the ends of the client route data which is determined as being usable in Step 420 (C2 and C6 in the example shown in FIGS. 6A–D), and guiding points of the client route which adjoin those guiding points and which are not identical with any guiding point of the server route (C3 and C5 in the example shown in FIGS. 6A–D) to the server.

On the other hand, the server, implementing Steps 520 through 525, determines whether or not the guiding point information of the guiding point of the client route (non-identical guiding point described above) has been received within a specified period of time since Step 515 was implemented. When the client implements Step 425 and the server receives the guiding point information of the client route, the server determines "YES" in Step 520 and proceeds to Step 530 to determine whether or not the non-identical guiding point of the client route of the received information exist in the server route. More specifically, the server searches for and determines a node in the server route at the same position as that of the non-identical guiding point. If a distance from the node to the outgoing-side guiding point or the incoming-side guiding point which adjoins the node is equal to a distance from the non-identical guiding point to an outgoing-side guiding point or an incoming-side guiding point which adjoins the non-identical guiding point, the sever determines that the non-identical guiding point exists in the server route.

The server then proceeds to Step 535 to transmit the result of the above-described search and determination to the vehicle identified by the vehicle ID. Accordingly, in the example shown in FIGS. 6A–D, since a node S5 exists in the server route shown FIG. 6C, which is identical with the guiding point C3 of the client route, however, any guiding point identical with the guiding point C5 does not exist therein, the server transmits the information indicating that to the client.

Figure 4:
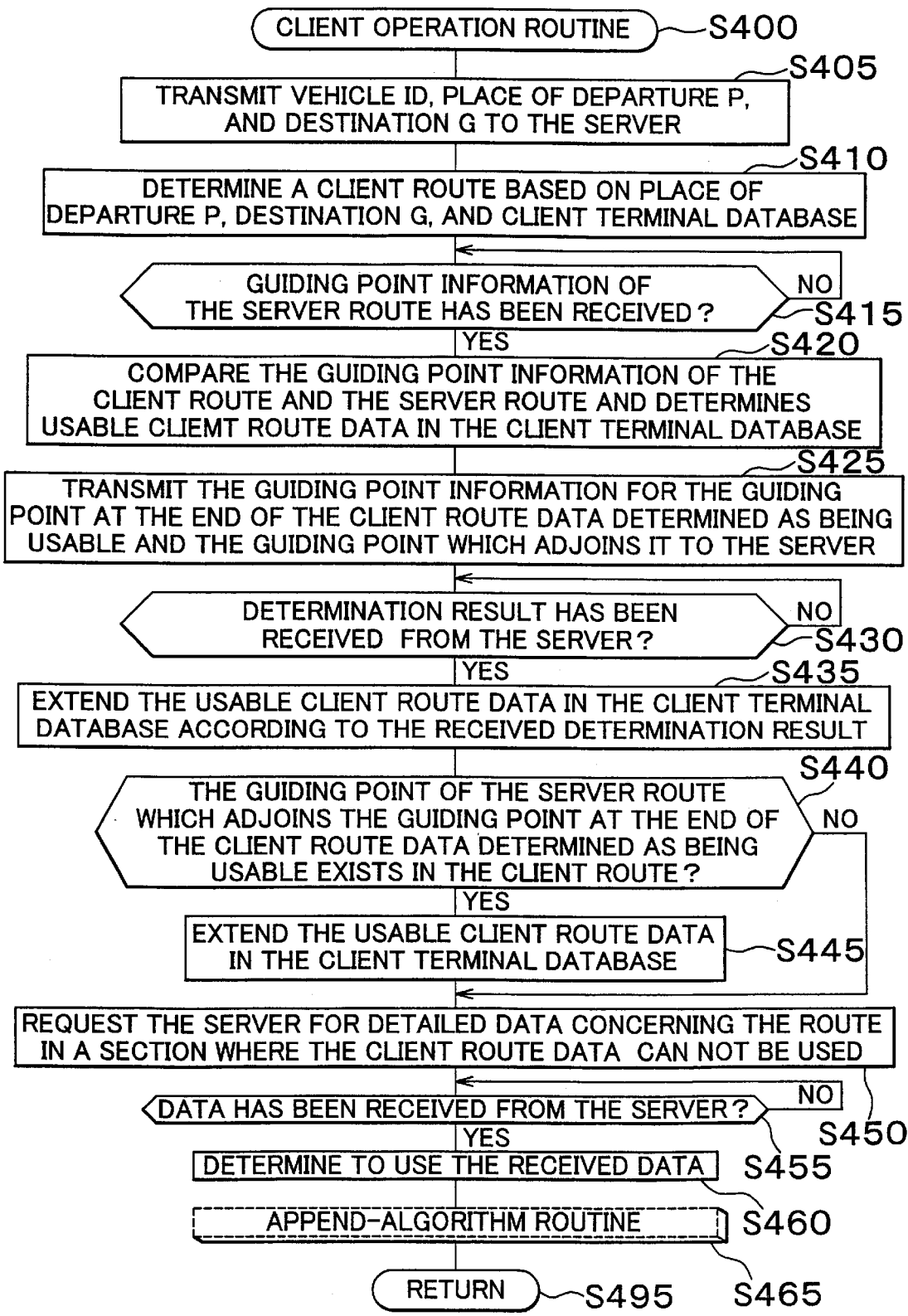
FIG. 4 is a flowchart of a routine to be executed by a client shown in FIG. 2.

During this process, the client repeatedly determines whether or not the above-described result of the determination has been received from the server in Step 430 shown in FIG. 4. If the result of the determination has been transmitted from the server, the client determines "YES" in Step 430 and proceeds to Step 435 to extend the usable sections of the client route data based on the result of the determination received in Step 435. Accordingly, if the result of the search and determination indicates that the non-identical guiding point of the client route exists in the server route, it is determined that the route navigation of the route between the guiding point of the client route which is identical with the guiding point of the server route and the non-identical guiding point be performed using the information in the client terminal database of the client terminal. In this way, in the example shown in FIGS. 6A–D, the client route data concerning routes between the guiding points C1–C2–C3 and C6–C7 is finally determined as being usable for the route navigation.

Then, the client proceeds to Step 440 and determines whether or not guiding points of the server route which adjoin the guiding points at the ends of the client route data determined as being usable as described above (guiding points of the server route which are identical with corresponding guiding points of the client route) exist in the client route. If it is determined that such guiding points exist in the client route, the client proceeds to Step 445 and extends the usable client route to those guiding points. The determination in Step 440 is made in the same method as the determination in Step 530 described above. Conversely, if the determination in Step 440 is "NO", the client directly proceeds to Step 450.

Figure 9:
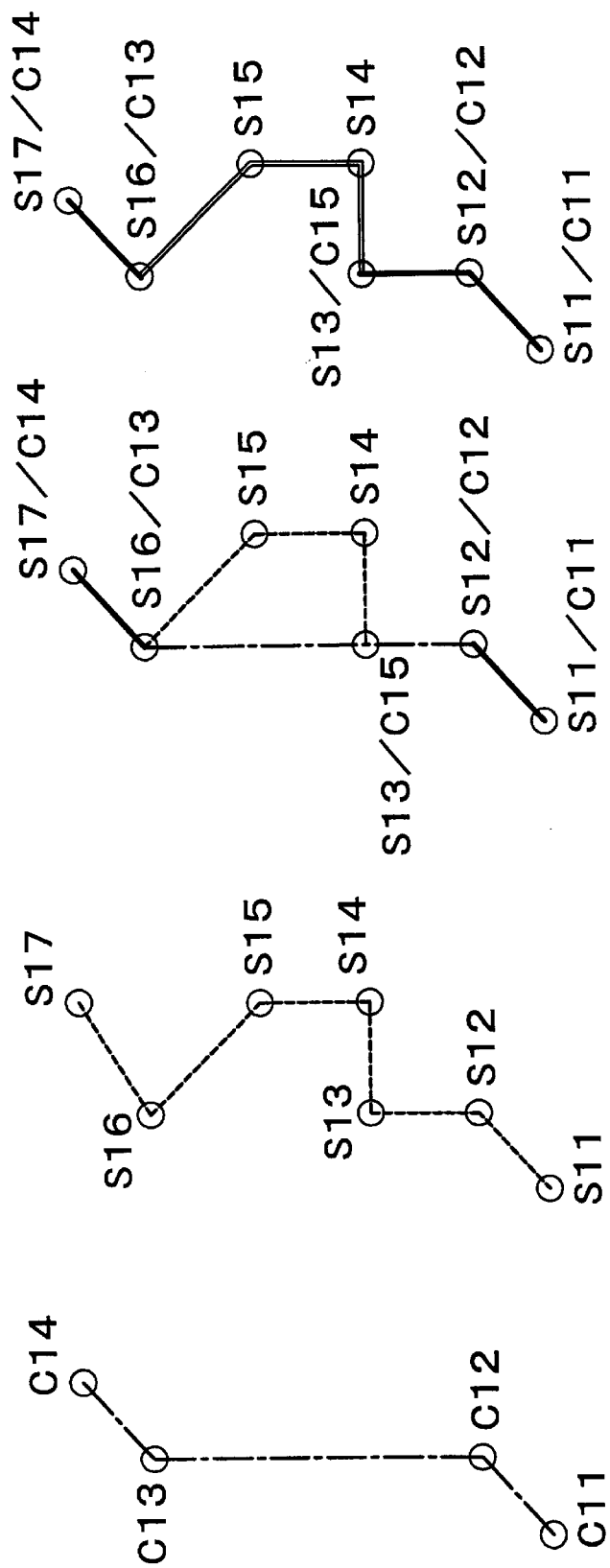
FIG. 9A is a drawing which shows the client route.
FIG. 9B is a drawing which shows the server route.
FIG. 9C is a drawing which shows the usable sections of the client route and remaining sections of the server route.
FIG. 9D is a drawing which shows extended usable sections of the client route and the server route, data of which has been transferred.

Hereinafter, the operations in Steps 440 and 445 will be described more clearly with reference to the example shown in FIGS. 9A–D. FIG. 9A shows the client route, and FIG. 9B shows the server route. In this example, as shown in FIG. 9C, the client route datum concerning routes between the guiding points C11–C12 and C13–14 are finally determined as being usable for the route navigation in Step 420. In Steps 425 through 435, since the guiding points of the client route which adjoin the guiding points (C12 and C13) at the ends of the client route data which has been determined as being usable are the guiding points C12 and C13, and there is no other intermediate guiding point in the client route, the usable client route data is not extended.

On the other hand, in Step 440, it is determined whether or not the guiding points S13 and S15 which adjoin the guiding points C12 and C13 at the ends of the client route data determined as being usable exist in the client terminal database. Then, since a guiding point C15 which corresponds to the guiding point S13 exists in the client terminal database 16, the usable client route (usable part of information concerning the client route in the client terminal database 16) is accordingly extended (determined) to cover routes between the guiding points C11–C12–C15 and C13–C14.

After the usable client route data has been extended in the above manner, the client proceeds to Step 450 and requests the server for detailed data concerning the server route in a section where the client route data can not be used. That is, in the example shown in FIGS. 6A–D, the detailed data concerning a route between the guiding points S5 (C3)-S3 (C6) is required, and, in the example shown in FIGS. 9A–D, the detailed data concerning a route between the guiding points S13 (C15)-S14–S15–S16 (C13) is required.

During this process, the server, implementing Step 540 through Step 545, determines whether or not the requirement for the detailed data concerning the server route in the sections where the client route data can not be used, has been received from the client.

If the client requests the server for the detailed data concerning the server route, the server determines "YES" in Step 540 and proceeds to Step 550. In Step 550, the server transmits the required detail data to the vehicle identified by the vehicle ID and proceeds to Step 595 to once finish the routine.

During this process, the client determines whether or not the detailed data has been received from the server in Step 455. Hence, if the server transmits the detailed data, the client determines "YES" in Step 455 and proceeds to Step 460. In Step 460, the client determines to use the received data (information) for the route navigation and proceeds to Step 495 to once finish the routine. The client, after completing Step 460, may proceed to Step 465 and execute an append algorithm, to be described later, before once finishing the routine in Step 495.

As described above, according to the first embodiment, the route from the place of departure P to the destination G is determined by the server as the server route along with the guiding points, using the server database, and is determined by the client as the client route along with the guiding points, using the client terminal database. The server or the client then transmits the guiding point information of the route, data amount of which is extremely small compared to that of the detailed information necessary for the route navigation, to the client or the server. Then the identicalness between the server route and the client route is determined based on the guiding point information. The server does not transmit the detailed information for the section where the server route and the client route are identical, and the client performs the route navigation of the route in the section using the information in the client terminal database, and thereby the amount of the information (data) to be transmitted to the client from the server is decreased.

Further, when determining the identicalness of the guiding points, the position of the guiding point, the distance between the guiding points, the outgoing direction from the outgoing-side guiding point, and the incoming direction to the incoming-side guiding point are compared so that the identicalness or non-identicalness between the corresponding guiding points is precisely determined. However, the above comparison for determining the identicalness of the guiding point does not need to be always made for all of those items but may be made selecting some of them.

Though, in the first embodiment, the client, implements Steps 425 through 445 after determining the client route in Step 420, the client, in another embodiment, may directly proceed to Step 450 after completing Step 420 to request the server for the detailed data. Also in this case, the information in the client terminal database 16 is effectively used and the server does not transmit the data which exists in the client terminal database and thereby the amount of data to be transmitted from the server via communication is decreased.

Further, in another embodiment, the information concerning the road type and property of the road X may be included with the guiding point information to be transmitted from the server in Step 515 and Step 425, the guiding point information to be transmitted from the client in Step 425 and the like so that the determination on the identicalness in Step 530 and Step 420 is made in consideration of the identicalness or non-identicalness of the road type and property of the road X.

For example, in the case where a highway extends over an ordinary road through the same route, the positions of the guiding points, the distance of the route between the guiding points, the outgoing direction from the outgoing-side guiding point, and the incoming direction from the incoming-side guiding point would be the same, however the guided route would be different. Therefore, in such a case, comparing the road type (and the property) realizes further accuracy in determining whether or not the server route and the client route between the guiding points are identical.

Next, a description will hereinafter be given for a route navigation system according to a second embodiment of the invention. This route navigation system is the same as the route navigation system according to the first embodiment in terms of hardware construction, however, it executes the append-algorithm shown in Step 465 in FIG. 4 when performing the route navigation. The append-algorithm can be executed as an auxiliary algorithm of the route merging algorithm in the first embodiment, or can be executed independent of the route merging algorithm in performing the route navigation of the route from the place of departure P to the destination G. In the following, an effect of the append-algorithm will be described with reference to an example where the appended algorithm is independently executed in performing the route navigation of the route from the place of departure P to the destination G.

Figure 10:
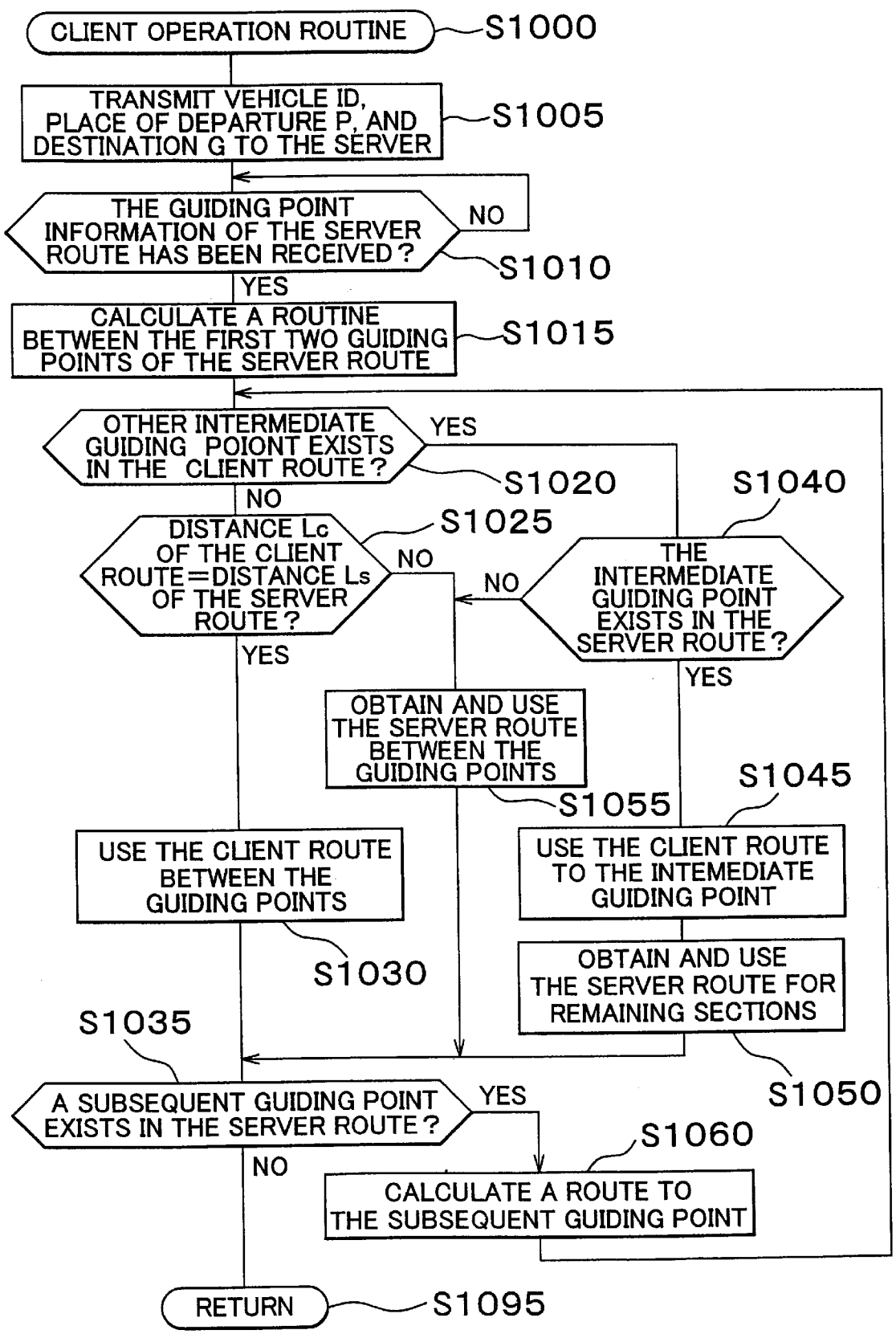
FIG. 10 is a flowchart which shows a routine to be executed by a client of a route navigation system according to a second embodiment of the invention.

According to the second embodiment, when the user of the vehicle inputs the destination G to the client, the client executes a client operation routine shown in a flowchart in FIG. 10. More specifically, when the user requests for the route navigation to the destination G and inputs the destination G to the client, the client starts operation from Step 1000 and proceeds to Step 1005, therein transmitting the information concerning the vehicle ID for identifying the vehicle, the place of departure P which is a vehicle position of the vehicle, and the destination G to the server.

On the other hand, receiving the information concerning the vehicle ID, the place of departure P, and the destination G from the client, the server determines a server route from the place of departure P to the destination G and transmits the guiding point information of the thus determined server route to the client in the same manner as Step 510 and Step 515 shown in FIG. 5.

During this process, the client determines whether or not the guiding point information of the server route has been received in Step 1010. If the guiding point information has been received, the client proceeds to Step 1015 to determine a route between the first two guiding points Ss and Sg (here the place of departure P is Ss and a guiding point which adjoins the place of departure P is Sg) of the server route in the received information, based on the data in the client terminal database 16. The guiding point Ss is called an outgoing-side guiding point as it is a guiding point of which the vehicle goes out while moving in a traveling direction thereof, and the guiding point Sg is called an incoming-side guiding point as it is a guiding point to which the vehicle comes while moving in the traveling direction thereof. A method of determining the route in Step 1015 is basically the same as Step 410 in FIG. 4. However, in Step 1015, a route in which an outgoing direction from the outgoing-side guiding point and an incoming direction to the incoming-side guiding point are both identical with those of the server route is only selected. That is, a route in which at least either one of the outgoing direction from the outgoing-side guiding point or the incoming direction to the incoming-side guiding point is not identical is excluded from routes to be determined.

Next, the client proceeds to Step 1020 and determines whether or not any other intermediate guiding point (not the guiding points corresponding to the two guiding points Ss and Sg of the server route) exists in the client route determined in Step 1015. If there exists no other intermediate guiding point therein, the client determines "NO" in Step 1020 and proceeds to Step 1025. The client, in Step 1025, determines whether or not a distance Lc which is a distance of a client route between the outgoing-side guiding point Cs and the incoming-side guiding point Cg is equal to a distance Ls which is a distance of the server route between the outgoing-side guiding point Ss and the incoming-side guiding point Sg. If they are equal, the client determines "YES" in Step 1025, and proceeds to Step 1030 to determine to use the client route data between the guiding points Cs and Cg for the route navigation between the two guiding points Ss and Sg, and the client thereafter proceeds to Step 1035.

FIGS. 11A–C show an example where the client determines "NO" in Step 1020 and "YES" in Step 1025, and proceeds to Step 1030. FIG. 11A shows the server route, and FIG. 11B shows the client route. In this example, there exists no other intermediate guiding point in the client route calculated by the client between the adjoining guiding points Ss and Sg of the server route, and the distance Lc of the client route between the guiding points Cs and Cg and the distance Ls of the server route between the guiding points Ss and Sg are equal. Therefore, the client, as shown in FIG. 11C, determines to use the client route data between the guiding points Cs and Cg for the route navigation between the two guiding points Ss and Sg of the server route.

Conversely, if there exists the other intermediate guiding point in the client route, the client determines "YES" in Step 1020 and proceeds to Step 1040 to confirm whether or not the other intermediate guiding point exists in the server route. More specifically, the client transmits the guiding point information for the other intermediate guiding point (including information concerning the position of the incoming-side guiding point or the outgoing-side guiding point which adjoins the intermediate guiding point and a distance between the other intermediate guiding point and the incoming-side guiding point or the outgoing-side guiding point) to the server, and the server then determines whether or not the other intermediate guiding point exists in the server route and transmits a result of the determination to the client.

In more detail, in the above determination, it is determined whether or not there exists a route between the other intermediate guiding point and the incoming-side guiding point or the outgoing-side guiding point which adjoins the other intermediate guiding point in the server route, and the result of the determination is transmitted to the client. Then, the client determines whether or not the other intermediate guiding point exists in the server route according to the transmitted result.

At this time, if the other intermediate guiding point exists in the server route, the client determines "YES" in Step 1040 and proceeds to Step 1045 to determine to use the client route data for the route navigation of the route between the other intermediate guiding point and the incoming-side guiding point or the outgoing-side guiding point which adjoins the other intermediate guiding point. The client thereafter proceeds to Step 1050 and requests the server for the detailed data of the server route in the sections for which the client route data remains unusable after completing the previous steps. Then the server, in response thereto, transmits the requested detailed data in the server database 24 to the client terminal, and the client determines to use the transmitted data for the route navigation.

Figure 12C:
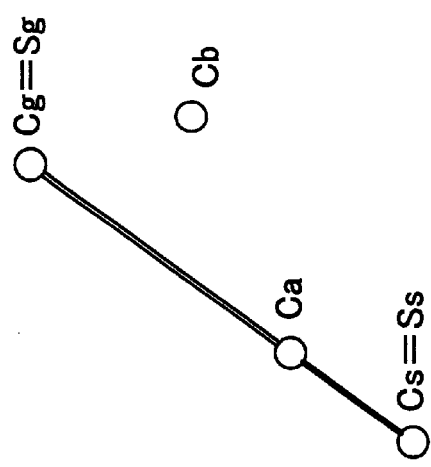
FIG. 12C is a drawing which shows the usable sections of the client route and the remaining sections of the server route, data of which has been transferred.
Figure 12B:
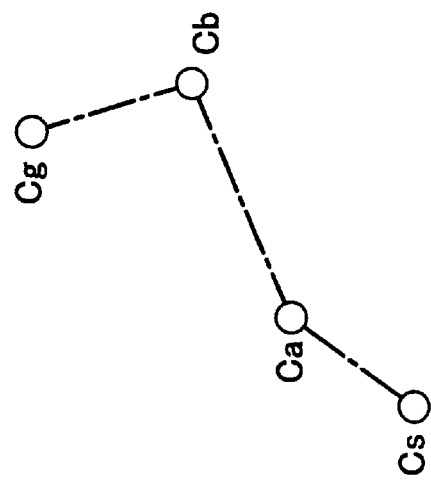
FIG. 12B is a drawing which shows the client route.
Figure 12A:
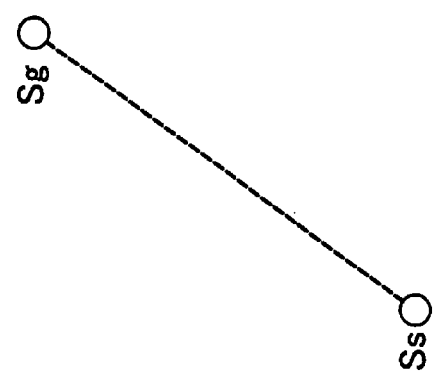
FIG. 12A is a drawing which shows the server route.

FIGS. 12A, 12B and 12C show an example where the client proceeds through Steps 1020, 1040, 1045 and 1050. FIG. 12A shows the server route, and FIG. 12B shows the client route. In this example, the other intermediate guiding points Ca and Cb exist in the client route calculated (determined) by the client between the adjoining guiding points Ss and Sg of the server route and the other intermediate guiding point Ca exists also in the server route. The client therefore determines to use the client route data for the route navigation between the guiding points Cs and Ca and uses the detailed data received from the server for the route navigation between the guiding points Ca and Cg.

Figures 13A, 13B, 13C:
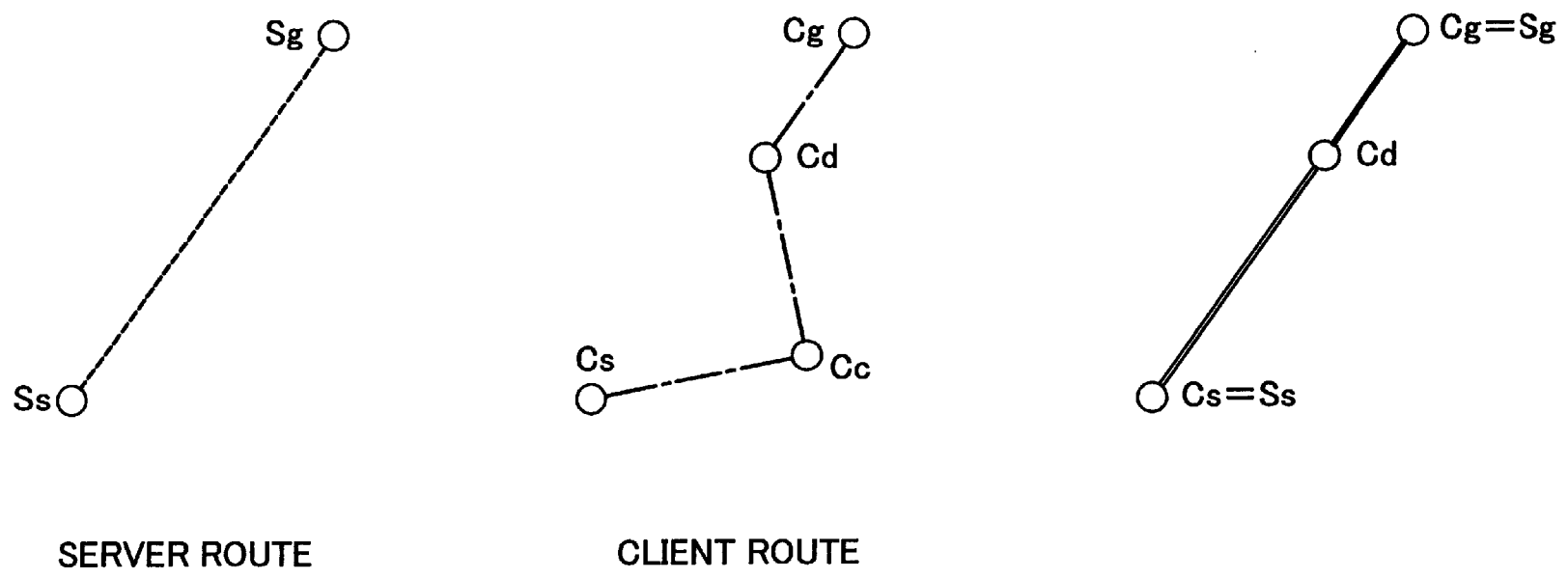

FIGS. 13A–C shows another example where the client proceeds through Steps 1020, 1040, 1045, and 1050. FIG. 13A shows the server route, and FIG. 13B shows the client route. In this example, the other intermediate guiding points Cc and Cd exist in the client route calculated (determined) by the client between the adjoining guiding points Ss and Sg of the server route and the other intermediate guiding point Cd exists also in the server route. The client, therefore, determines to use the client route data for the route navigation between the guiding points Cd and Cg and uses the detailed data received from the server for the route navigation between the guiding points Cs and Cd.

Conversely, if no other intermediate guiding point exists in the server route, the client determines "NO" in Step 1040 and proceeds to Step 1055 and therein requests the server for the detailed data concerning the server route between the two adjoining guiding points. Then, the server, in response thereto, transmits the requested detailed data, and the client determines to use the transmitted detailed data for the route navigation. Though it is sufficient for the detailed data received in Step 1055 to include minimal information necessary for performing the route navigation along the server route, the detailed data may be map data of surrounding areas of the route, which includes the above minimal information.

Figure 14C:
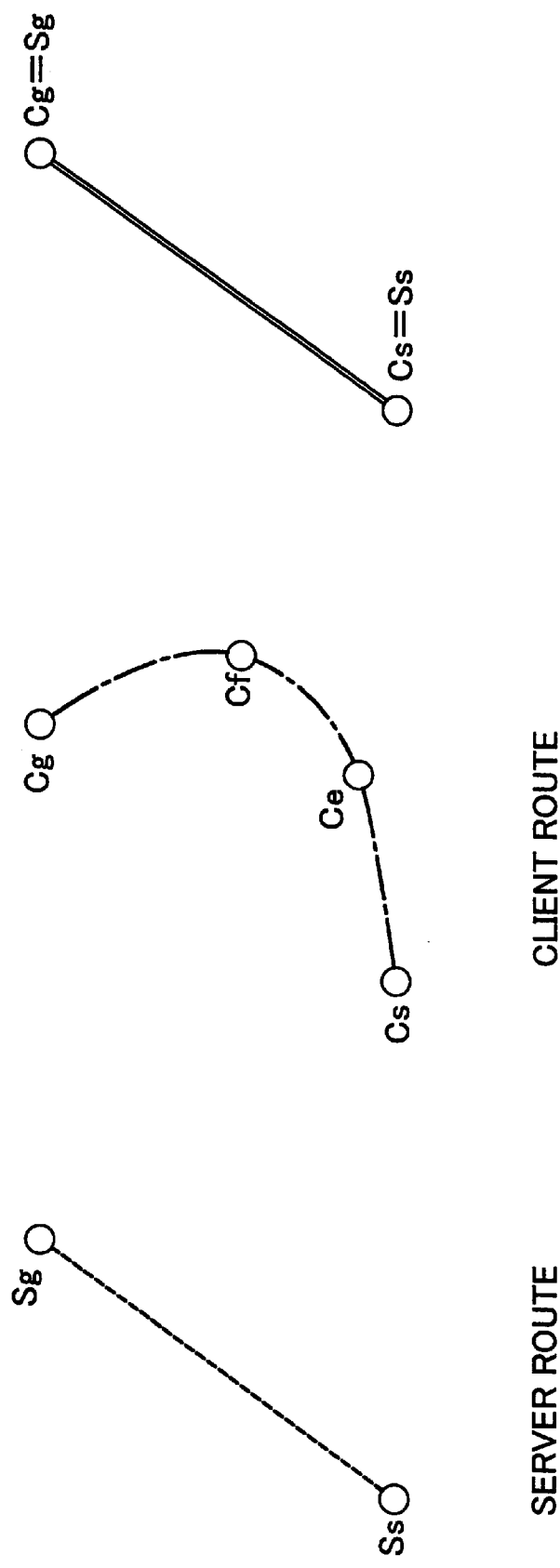
FIG. 14C is a drawing which shows the server route, data of which has been transferred.

FIGS. 14A–C shows an example where the client proceeds through Steps 1020, 1040, and 1055. FIG. 14A shows the server route, and FIG. 14B shows the client route. In this example, other intermediate guiding points Ce and Cf exist in the client route but neither of them exists in the server route. The client, therefore, requests for and receives the detailed data concerning the entire server route between the guiding points Ss and Sg in Step 1055 and determines to use the received detailed data for the route navigation.

On the other hand, if the client determines "NO" in Step 1025, the client proceeds to Step 1055. In this step, the client requests for and receives the detailed data concerning the entire server route between the guiding points Ss and Sg and determines to use the received detailed information for the route navigation.

FIGS. 15A–C shows an example where the client proceeds through Steps 1020, 1025, and 1055. FIG. 15A shows the server route, and FIG. 15B shows the client route. In this example, though no other intermediate guiding point exists in the client route, the distance Lc of the client route and the distance Ls of the server route are different. That is, the client route and the server route are completely different routes even though the guiding points of those are identical. In this case, the client route data can not be used, and the client, therefore, requests for and receives the detailed data concerning the entire server route between the guiding points Ss and Sg in Step 1055 and determines to use the received detailed data for the route navigation.

After this, the client proceeds to Step 1035 and determines whether or not a subsequent guiding point exists in the server route, which is, in other words, whether or not the calculation of the client route to the destination G has been completed. If a subsequent guiding point exists, the client determines "YES" in Step 1035 and proceeds to Step 1060. In Step 1060, the client, taking the incoming-side guiding point Sg as the outgoing-side guiding point Ss of the subsequent section and the subsequent (next adjoining) guiding point of the server route as the incoming-side guiding point Sg of the subsequent section, calculates the client route therebetween, and the routine returns to Step 1020.

Repeating these operations, the client calculates the client route to each guiding point of the server route, and the usable client route data is determined while receiving the detailed data concerning the server route in the section, for which the client route data can not be used, from the server. When the entire client route to the destination G has been calculated and necessary information (data) has been all received, the client determines "NO" and proceeds to Step 1095 to finish the routine.

As described above, according to the second embodiment, the server route from the place of departure P to the destination G is determined, and the client route is calculated to each adjoining guiding point of the server route, and, according to identicalness or non-identicalness between the client route and the server route, the usable client route data is determined while the detailed data concerning the server routes in the sections for which the client route data can not be used is transmitted to the client terminal from the server. Also the determination of the identicalness or non-identicalness between the client route and the server route is made based on the guiding point information which is transferred between the server and the client terminal in small size data via communication. This enables an effective use of the information in the client terminal database, and thereby decreases the amount of the information to be transmitted to the client from the server. Further, since the client terminal determines the client route to each adjoining guiding point, compared to the case where the entire client route from the place of departure P to the destination G is determined at once using the information in the client terminal database, the server route and the client route are more likely to be identical. Also in this viewpoint, the amount of the information to be transmitted to the client terminal from the server is decreased in the system described above.

In the calculation of the client route in Step 1015, as described above, the route, in which at least either one of the outgoing direction from the outgoing-side guiding point or the incoming direction to the incoming-side guiding point is not identical, is excluded from routes to be determined. Due to this, there is a case where the client route is not determined. In such a case, the client proceeds to Step 1055 and obtains the detailed information concerning the entire route between the guiding points (between the outgoing-side guiding point Ss and the incoming-side guiding point Sg) from the server. Also, for such a route in which at least either one of the outgoing direction from the outgoing-side guiding point or the incoming direction to the incoming-side guiding point is not identical, not only the determinations in Step 1020 and Step 1025, but also the determination of the identicalness of the outgoing direction from the outgoing-side guiding point and the incoming direction to the incoming-side guiding point between the client route and the server route is not necessary as a result of being excluded from routes to be determined.

Further, in another embodiment, the client, after determining "NO" in Step 1020 and "YES" in Step 1025, may further determine whether or not the road type (and/or property) of the server route between the outgoing-side guiding point Ss and the incoming-side guiding point Sg and the road type (and/or property) of the client route between the outgoing-side guiding point Cs and the incoming-side guiding point Cg are identical. If they are not identical, the client proceeds to Step 1055 and obtains the detailed information concerning the entire server route.

Next described will be a route navigation system in accordance with a third embodiment of the invention. This route navigation system has the same construction as the route navigation systems of the first and second embodiments as far as hardware is concerned. The system of the third embodiment performs route navigation from a place of departure P to a destination G by executing the "append algorithm" of the second embodiment through the use of a software program that is different from that used in the second embodiment in order to reduce a user's waiting time for a calculation result (time prior to a start of a route navigation).

An overall operation of this embodiment will be described with reference FIG. 16, which illustrates an overall operation of a client and a server in a time series manner. First, a user of the client, desiring that a route navigation be started, inputs a destination G into the client at a time point t0. At an immediately subsequent time point t1, the client transmits information regarding the vehicle ID of the vehicle in which the client is installed, and a place of departure P which is the present position of the vehicle, and the input destination G, to the server.

The server, receiving the information at a time point t2, determines a server route from the place of departure P to the destination G through a calculation similar to the calculation performed by the server of the first and second embodiments. The server needs a predetermined amount of time for the server route calculation. At the elapse of the predetermined time, that is, at a time point t3, the server transmits information regarding guiding points of the determined server route (which is information that specifies the guiding points and is also termed "guiding point information") to the vehicle specified by the vehicle ID as in step 515 in FIG. 5. In this embodiment, too, the guiding point information transmitted from the server to the client includes information concerning the position POS of a node n that is a guiding point (latitude x, longitude y, altitude z), information concerning an incoming direction (incoming azimuth direction) to the node n and an outgoing direction (outgoing azimuth direction) from the node n, and information concerning a distance L of the road between adjacent guiding points.

During the period from the time point t1 to the time point t4, the client, on the other hand, searches a point corresponding to the first guiding candidate point from a client terminal-side database, and collects data for specifying the searched point (hereinafter, also referred to as "first guiding candidate point specifying data"), and stores the collected data as data regarding the first guiding candidate point C1(i)

(i is a natural number) into an internal memory. The first guiding candidate point refers to a point (node) which is stored in the client terminal-side database and which can be the first guiding point that is a guiding point adjacent to the place of departure P (that may be referred to as "the 0th guiding point") (i.e., the first guiding point after the departure).

The guiding point is "a point which is included in a route from a place of departure P to a destination G and which requires provision of a guidance for a user, including a point of change into a road of a different road kind (e.g., a point of change from a national road to a prefectural road), a point at which the road property changes although the road kind remains the same (e.g., a point of change from a national road No. 1 to a national road No. 2), a point of a left turn, a right turn, a U-turn and the like, etc." as mentioned above.

Therefore, on the basis of the definition of a guiding point, the first guiding candidate point is a point which exists on the road where the vehicle is running at the place of departure P (if the vehicle is at an intersection, all the roads intersecting at the intersection are concerned), and at which the road intersects with another road (including a point at which the road branches) or at which the road changes in the road kind or road property although the road does not intersect with another road). Statistically, it is considered that the first guiding point exists within a predetermined distance from a place of departure P. Therefore, the first guiding candidate point is limited to points that exist within the predetermined distance from the place of departure P.

Figure 17:
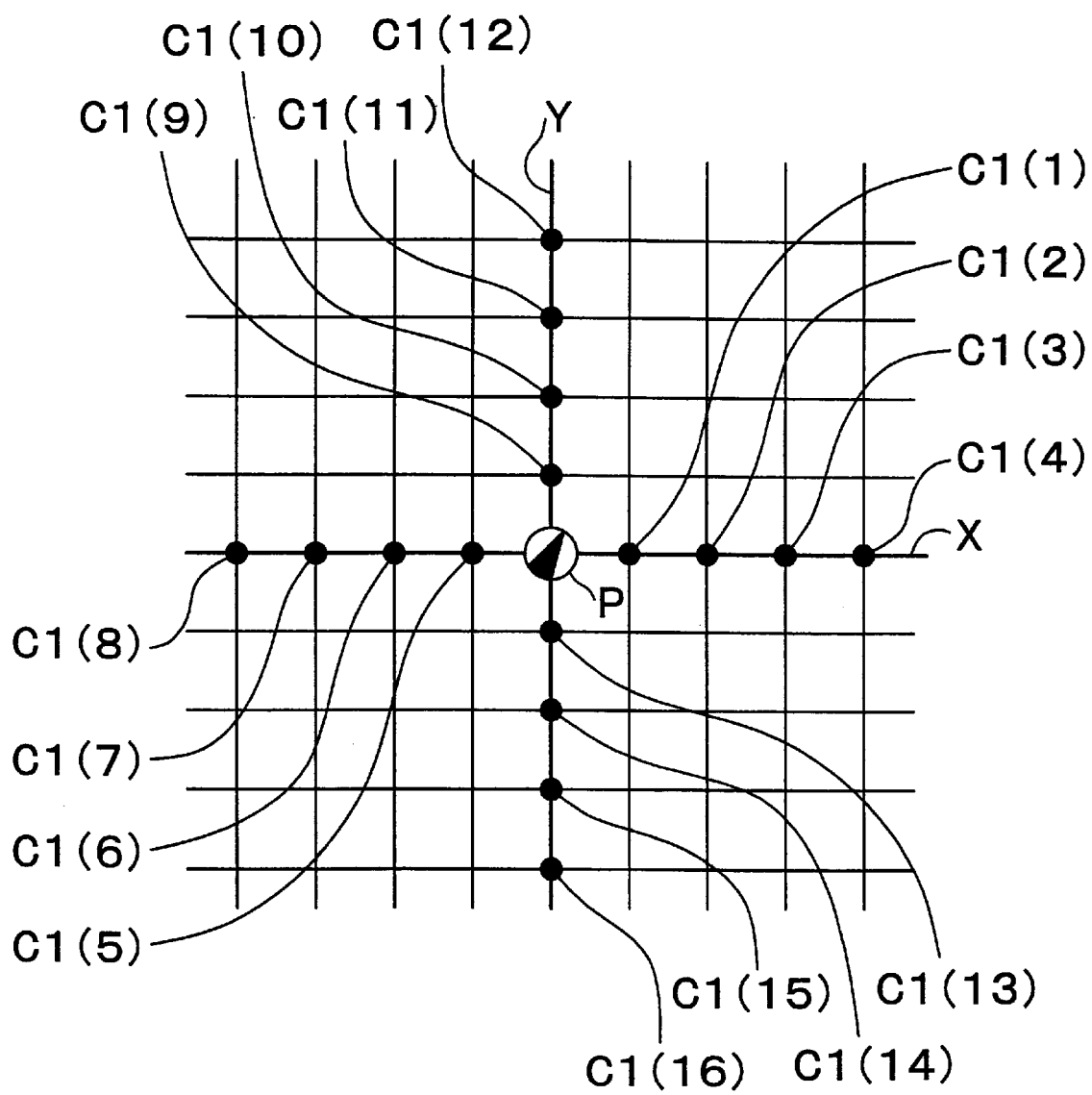
FIG. 17 is a diagram for illustrating an example of a first guide candidate point.

FIG. 17 is a diagram for illustrating an example of the first guiding candidate point C1(i). In the example shown in FIG. 17, the vehicle, when at the place of departure P, exists at an intersection between a road X and a road Y. Therefore, from the definition of the guiding point, the first guiding candidate point includes intersections (branching points) C1(1) to C1(8) on the road X and intersections (branching points) C1(9) to C1(16).

Figure 18:
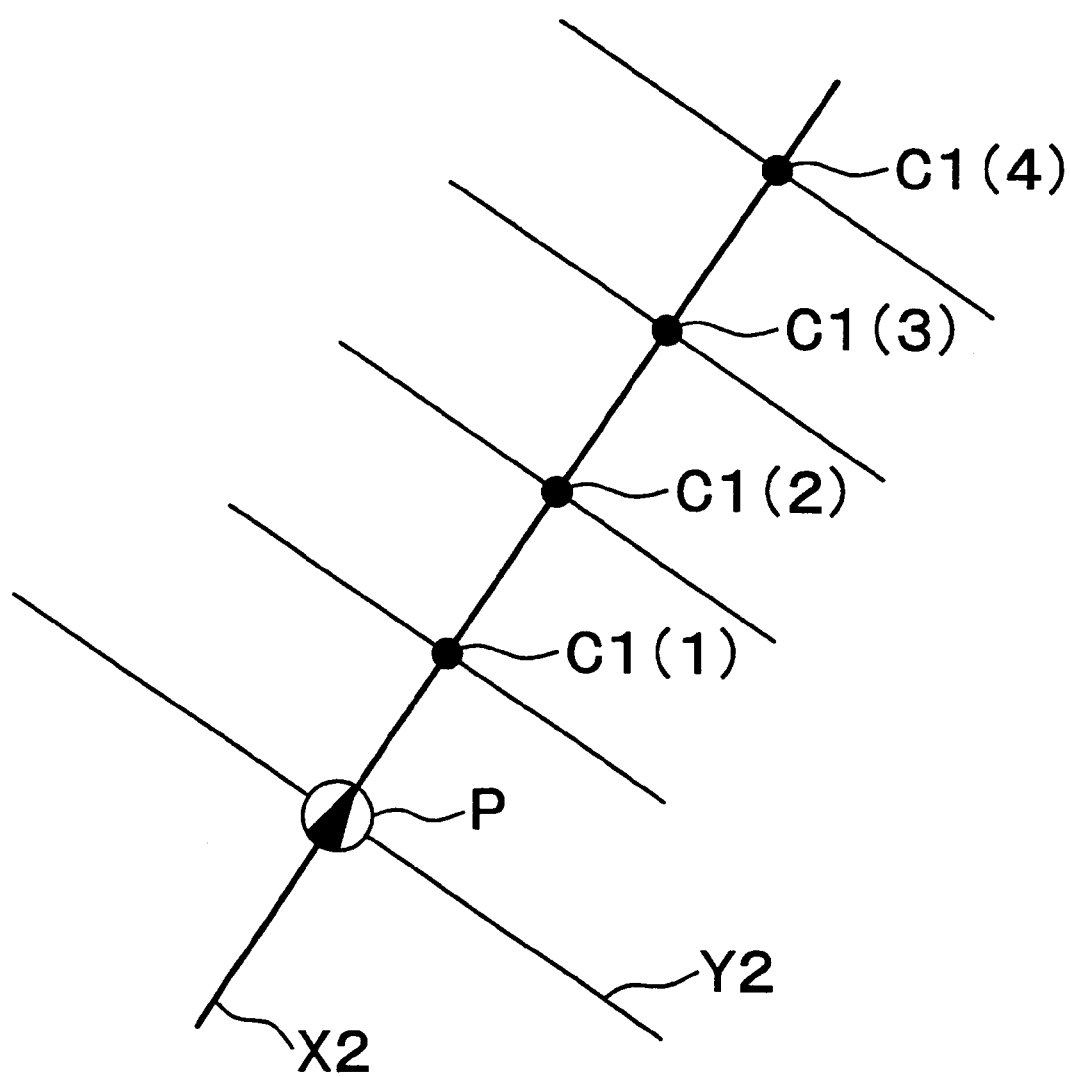
FIG. 18 is a diagram for illustrating another example of a first guide candidate point.

FIG. 18 is a diagram for illustrating another example of the first guiding candidate point C1(i). In the example shown in FIG. 18, the vehicle, when at the place of departure P, exists at an intersection between a road X2 and a road Y2. If it is apparent that the vehicle is running on the road X2 in one direction, it is considered that the vehicle maintains the traveling direction at least until the vehicle reaches the first guiding point. Therefore, in this case, the first guiding candidate point is limited to intersections (branching points) C1(1) to C1(4) on the road X2.

The client searches first guiding candidate points based on the foregoing discussion, and reads information regarding the position (latitude x, longitude y, altitude z) of each point searched, the incoming direction to each point, the outgoing direction from the place of departure P to each point, and the distance from the place of departure P to each point, from the client-side database, and stores the read data as guiding candidate point specifying data regarding the first guiding candidate points C1(1), C1(2), . . . C1(n) (n is a natural number) into the internal memory. This processing, which includes data search, data collection and data storage, ends in a shorter time than complicated route calculation. That is, in normal cases, the client can finish the processing of search of first guiding candidate points, data collection and data storage before the time point t4 at which the client receives the guiding point information provided as a result of completion of a route calculation by the server.

Upon receiving the guiding point information of the server route at the time point t4, the client compares the first guiding point specified by the received guiding point information and the first guiding candidate points C1(i) (i=1 to n), and determines whether there is a first guiding candidate point C1(i) that is identical to the first guiding point. If there is a first guiding candidate point C1(i) identical to the first guiding point, the client determines that the client will perform route navigation using information stored in the client terminal-side database from the place of departure P to the first guiding candidate point C1(i) (that is identical to the first guiding point). If there is no first guiding candidate point C1(i) identical to the first guiding point, the client determines that the client will perform route navigation using information from the server-side database from the place of departure P to the first guiding point, and requests the server to transmit information needed for the route navigation of the section from the place of departure P to the first guiding point, and receives the information from the server.

After that, the client searches kth guiding candidate points Ck(i) with reference to the (k−1)th guiding point (k is an integer greater than 2) in a manner similar to the manner of searching the first guiding candidate points C1(i) with reference the place of departure P (the 0th guiding point), and collects and stores data regarding the kth guiding candidate points Ck(i). If there is a kth guiding candidate point identical to the kth guiding point, the client performs route navigation using information stored in the client terminal-side database from the (k−1)th guiding point and the kth guiding point (i.e., the kth guiding candidate point identical to the kth guiding point). If there is no kth guiding candidate point identical to the kth guiding point, the client receives information from the server-side database, and performs route navigation using the received data from the (k−1)th guiding point to the kth guiding point.

The client may also be designed so that the client calculates a client route for each pair of adjacent guiding points on a server route, and determines available client route data in accordance with whether the client route conforms to the server route, and receives from the server detailed information with regard to the portions of the route where client route data is unavailable. Thus, overall operation of this embodiment has been described.

According to the embodiment, the server calculates a server route. During the time (time point t1 to t4 in FIG. 16) of waiting for a result of the calculation, the client searches first guiding candidate points, and collect and stores data regarding the first guiding candidate points. Therefore, unlike the client in the second embodiment, the client in the third embodiment does not need to perform the calculation of a route from the place of departure P to the first guiding point which requires a relatively long time after receiving the guiding point information of the server route. That is, the client is able to immediately determine whether there is a first guiding candidate point identical to the first guiding point. Therefore, it becomes possible to immediately obtain information to be used with respect to the road from the place of departure P to the first guiding point. Therefore, according to the embodiment, it becomes possible to quickly start a route navigation particularly immediately after a departure.

A more specific operation of the above-described third embodiment will next be described. The client repeatedly executes a route navigation data acquisition starting routine illustrated by the flowchart of FIG. 19 at every elapse of a predetermined time. Therefore, when a predetermined timing is reached, the client starts the process at step 1900, and proceeds to step 1905. In step 1905, the client determines whether a user has newly input a destination G, with a request for route navigation to the destination G. If the user has not input a destination G, the client determines "NO" in step 1905, and proceeds to step 1995, in which the client temporarily ends this routine. That is, by monitoring whether there is an input of a destination G at every elapse of a predetermined time, the client performs monitoring as to whether to start route navigation.

Figure 16:
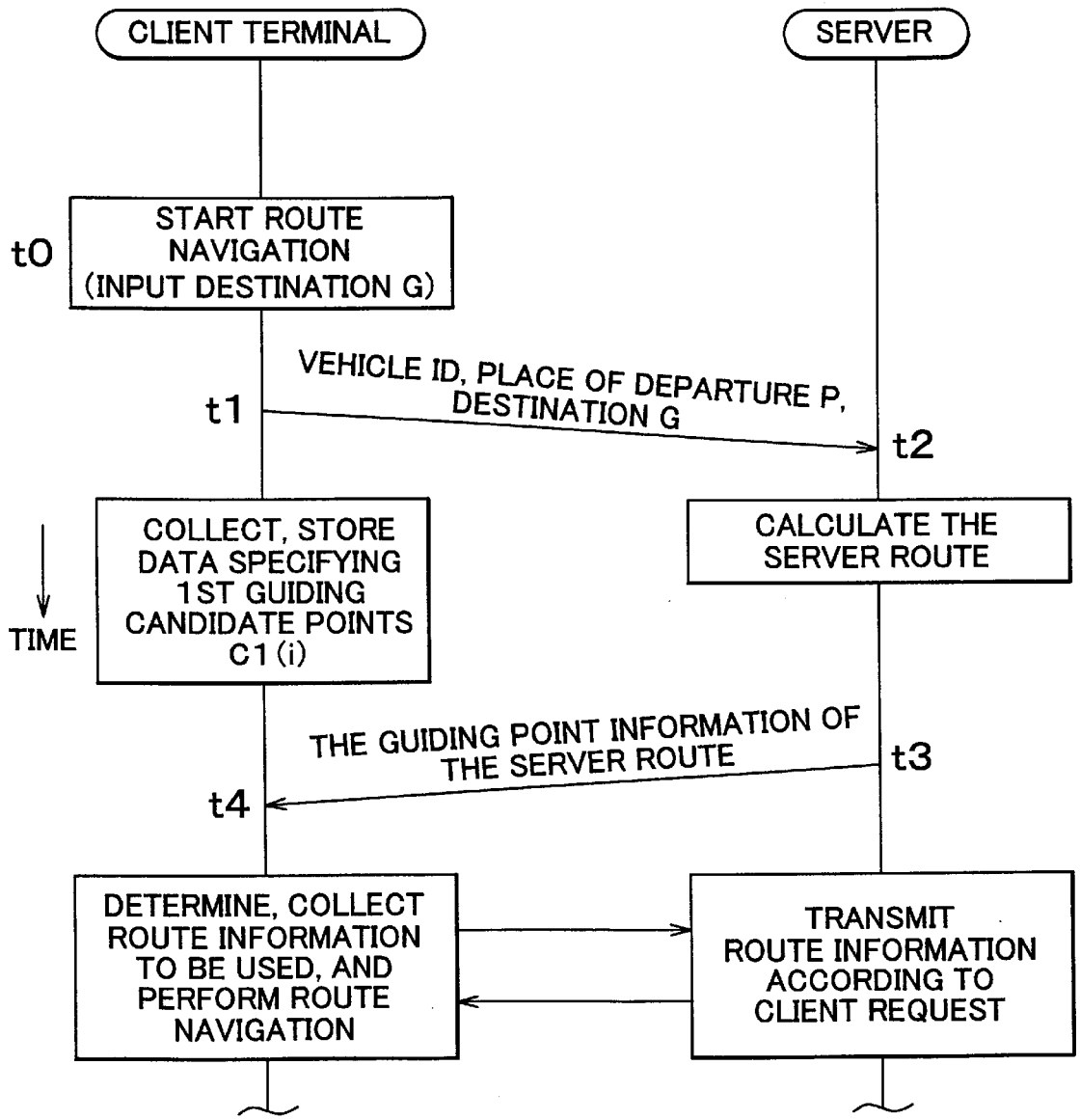
FIG. 16 is a drawing which illustrates an overall operation of a client and a server in a time series manner according to a third embodiment of the invention.

Therefore, if a user requests route navigation to a destination G and inputs the destination G (see time point t0 in FIG. 16), the client determines "YES" in step 1905, and proceeds to step 1910, in which the client transmits the vehicle ID specifying the vehicle and information specifying the place of departure P, that is, the present position, and the destination G, as server route request signals to the server (see time point t1 in FIG. 16).

The client subsequently proceeds to step 1915, in which the client sets the value of a route navigation start flag FST to "1". Subsequently in step 1995, the client temporarily ends the routine. The value of the route navigation start flag FST is set to "0" when the ignition switch (not shown) is changed from an "OFF" state to an "ON" state, and also when a below-described first guiding candidate point search ends.

Figure 20:
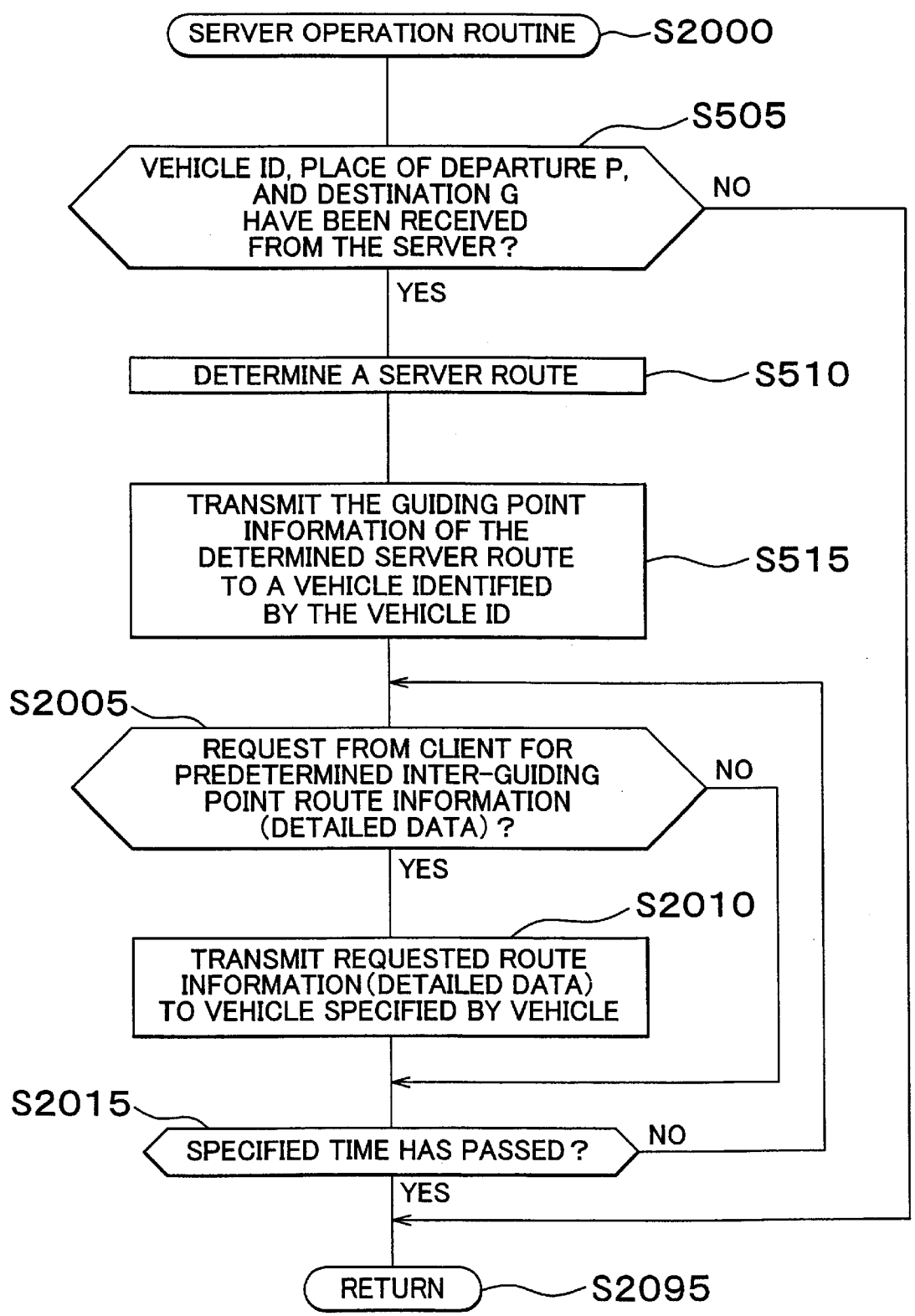
FIG. 20 is a flowchart which shows a server operation routine.

On the other hand, the server repeatedly executes a server operation routine illustrated by the flowchart of FIG. 20, in which steps equal to those in FIG. 5 are represented by reference numerals equal to those used in FIG. 5, at every elapse of a predetermined time. In step 505, the server monitors whether the server has received the information specifying the vehicle ID, the place of departure P and the destination G. Therefore, if a user inputs a destination G into the client, the information specifying the vehicle ID, the place of departure P and the destination G is transmitted to the server. Upon receiving the information (see time point t2 in FIG. 16), the server proceeds to step 510 provided as a server route determining means. In step 510, the server calculates and determines a server route based on the aforementioned equation (1). In step 515 as a guiding point information transmitting means, the server transmits information (guiding point information) for specifying the guiding points on the determined server route to the vehicle specified by the vehicle ID received in step 505 (see time point t3 in FIG. 16). The processing of step 510 needs a predetermined time (see time point t2 to time point t3 in FIG. 16).

Figure 21:
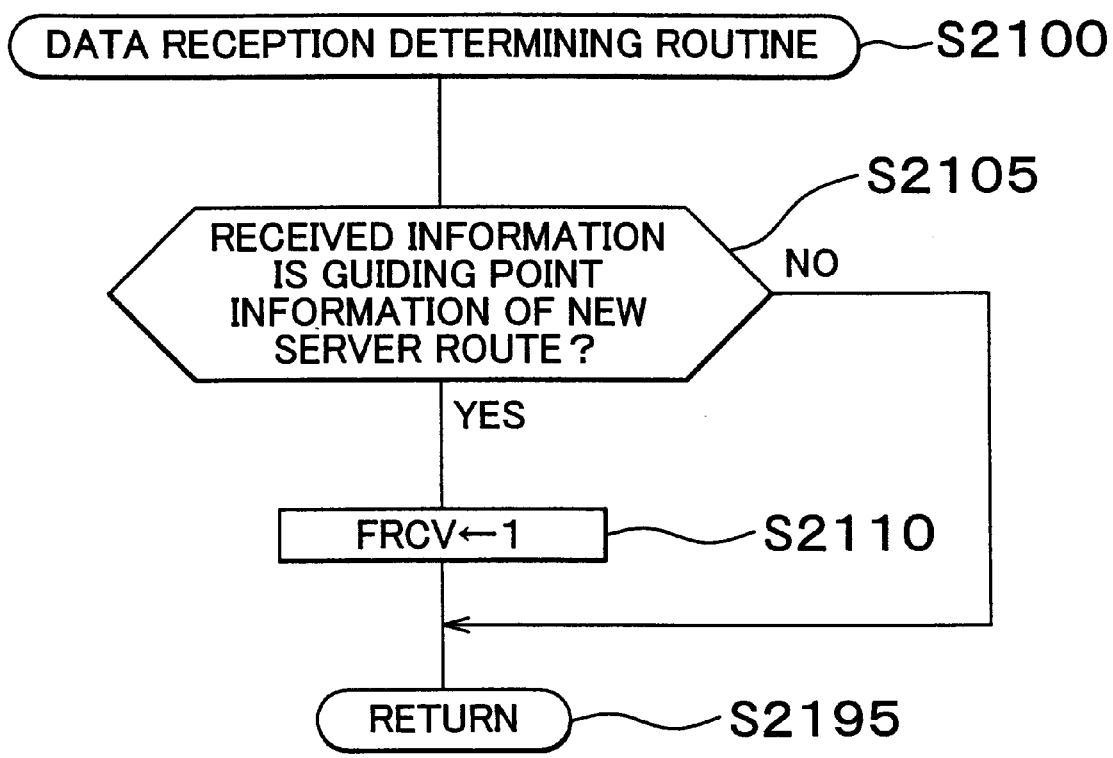
FIG. 21 is a flowchart which shows a data reception determining routine.

The client executes a data reception determining routine illustrated by the flowchart of FIG. 21 every time the client receives a signal. Therefore, upon receiving a signal, the client starts processing at step 2100, and proceeds to step 2105, in which the client determines whether the received signal is new server route guiding point information that has been transmitted in response to the server route request signal. If the client confirms that the received information is the guiding point information, the client stores the received information as guiding point information into an internal memory. The client stores the ith guiding point information as guiding point information S(i). Subsequently in step 2110, the client sets the value of a reception completion flag FRCV to "1". Subsequently in step 2195, the client temporarily ends the routine. The value of the reception completion flag FRCV is set to "0" when the ignition key (not shown) is changed from the "OFF" state to the "ON" state, or when the route navigation ends as described below. Conversely, if the received signal is not guiding point information, the client proceeds from step 2105 immediately to step 2195, in which the client temporarily ends the routine.

Therefore, if the present time point is immediately after the time point when information specifying the vehicle ID, the place of departure P and the destination G is transmitted from the client to the server (see time point t2 in FIG. 16), the serer is executing step 510, and therefore guiding point information obtained as a result of step 510 has not been transmitted to the client. Therefore, the client comes to repeatedly execute steps 2105 and 2195, so that the value of the reception completion flag FRCV is kept at "0".

Figure 22:
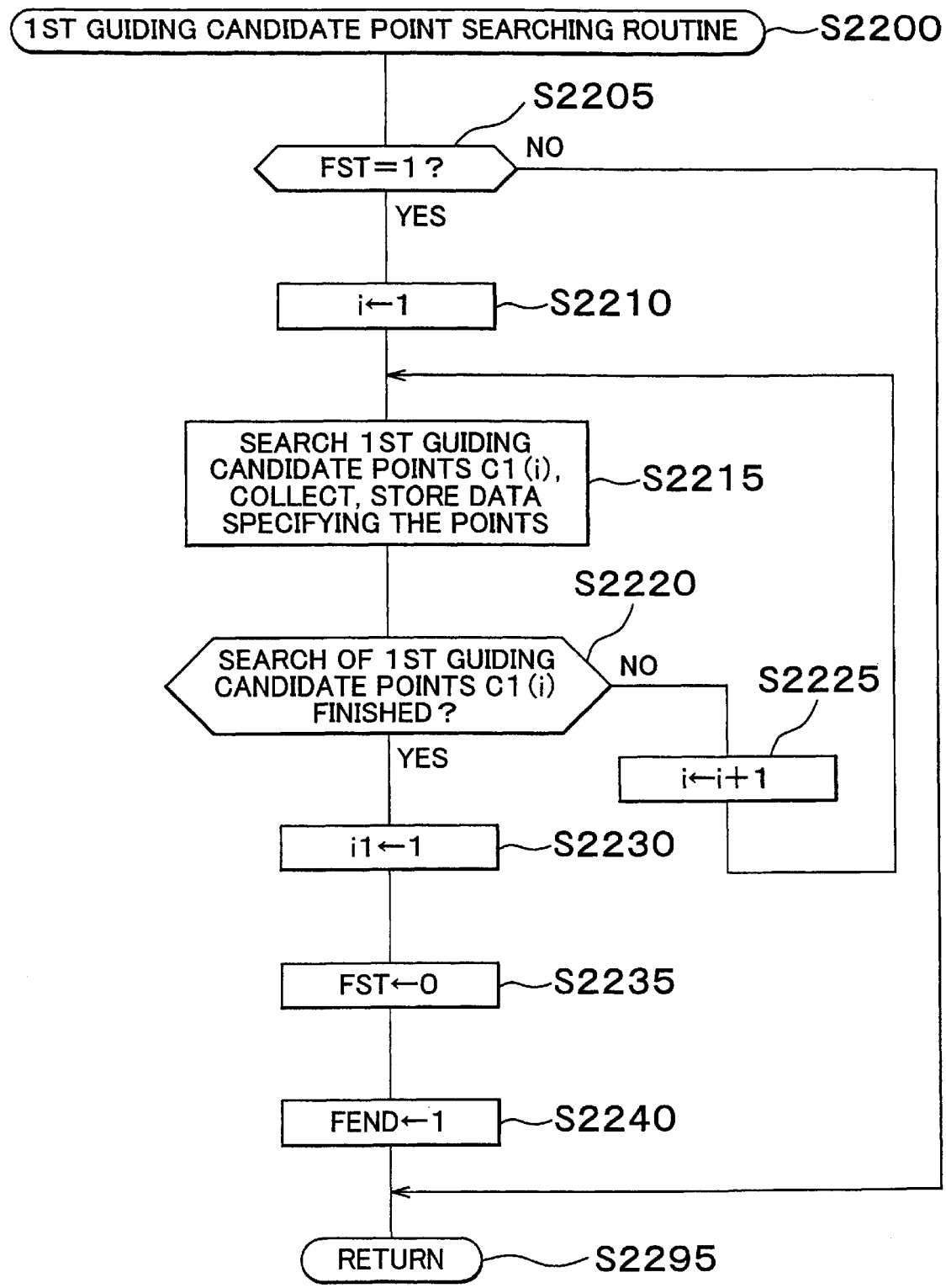
FIG. 22 is a flowchart which shows a first guiding candidate point searching routine.

The client repeatedly executes a first guiding candidate point searching routine illustrated in FIG. 22 at every elapse of a predetermined time. Therefore, at every timing, the client proceeds from step 2200 to step 2205, in which the client determines whether the value of the route navigation start flag FST is "1". If the value of the route navigation start flag FST is not "1", the client immediately proceeds to step 2295, in which the client temporarily ends the routine.

Figure 19:
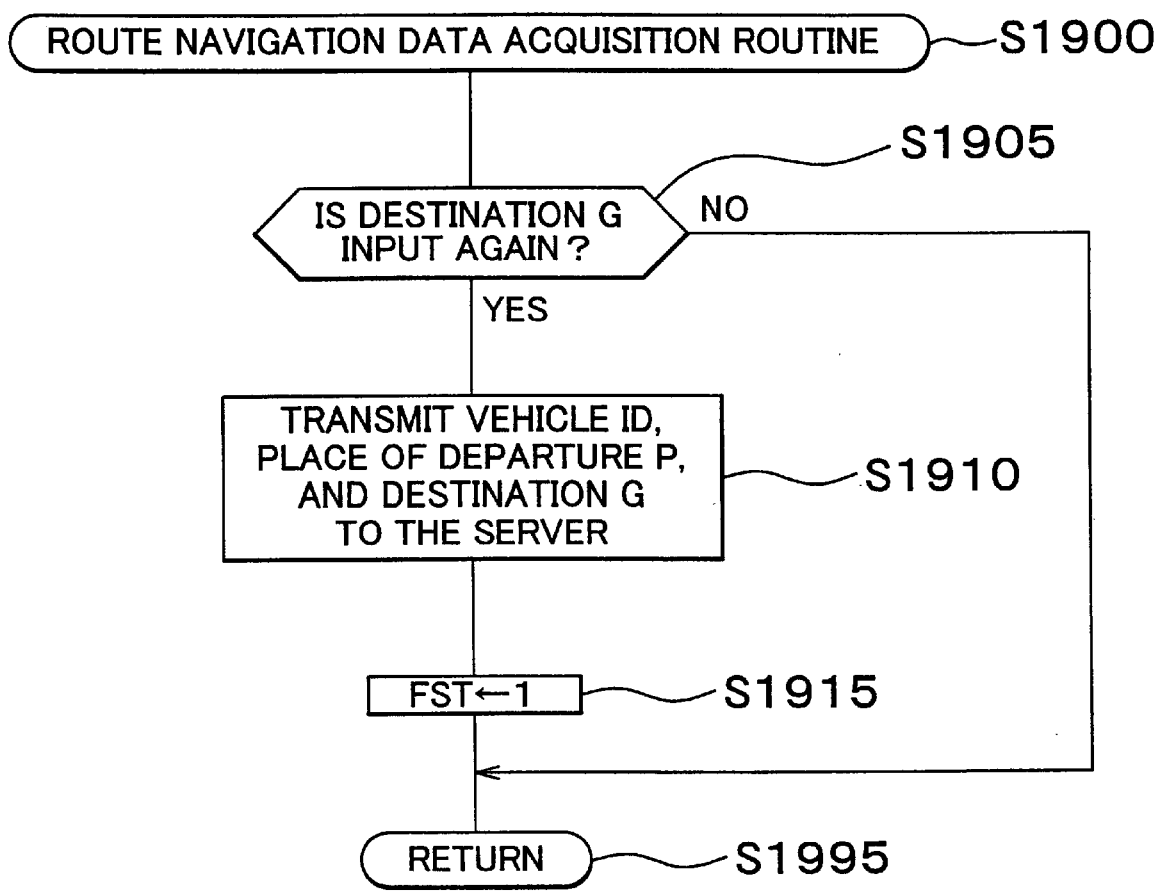
FIG. 19 is a flowchart which shows a route navigation data acquisition starting routine.

If the present time point is immediately after a time point when a user inputs a destination G into the client (see time point t0 in FIG. 16), the value of the route navigation start flag FST has been set at "1" by step 1915 in FIG. 19. Therefore, the client determines "YES" in step 2205, and proceeds to step 2210. In step 2210, the client sets the value of a variable "i" at "1". Subsequently in step 2215, the client searches a first guiding candidate point C1(i) (=C1(1)) corresponding to the 0th guiding point (i.e., the place of departure P) based on data stored in the client-side database, and stores client-side database-stored information regarding the position (latitude x, longitude y, altitude z) of the point C1(1), the incoming direction to the point, the outgoing direction from the place of departure P to the point, and the distance from the place of departure P to the point, as first guiding candidate point-specifying information (data) into the internal memory of the client.

Next, the client proceeds to step 2220, in which the client determines whether the search, data collection and data storage regarding the first guiding candidate points C1(i) has been entirely completed. As the present time point is immediately after the search of the first point (i=1) as a first guiding candidate point C1(1) and it is normally the case that a plurality of first guiding candidate points C1(1) exist, the client determines "NO" in step 2220, and proceeds to step 2225. In step 2225, the client increases the value of the variable "i" by "1". The client then goes back to step 2215, in which the client performs the search, data collection and data storage regarding the next first guiding candidate point C1(2).

After the client completes the search of all the first guiding candidate points C1(i) in the above-described manner, the client determines "YES" in step 2220, and proceeds to step 2230. In step 2230, the client stores the present value of the variable "i" as a storage value i1. The client then proceeds to step 2235, in which the client sets the value of route the navigation start flag FST at "0". Subsequently in step 2240, the client sets the value of a search end flag FEND at "1", in order to indicate that the search of first guiding candidate points has ended. Subsequently in step 2295, the client temporarily ends the routine. The value of the search end flag FEND is set at "0" when the ignition key (not shown) is changed from the "OFF" state to the "ON" state, and when the route navigation ends as described below.

In the above-described manner, the guiding candidate point specifying data regarding the first guiding candidate points C1(i) (i=1 to i1) is collected from the client-side database, and is stored into the internal memory of the client. This processing is mainly made up of search (data collection), and does not contain a complicated calculation such as a route calculation or the like. Therefore, in most cases, this processing ends before the server finishes the calculation of a server route.

Figure 23:
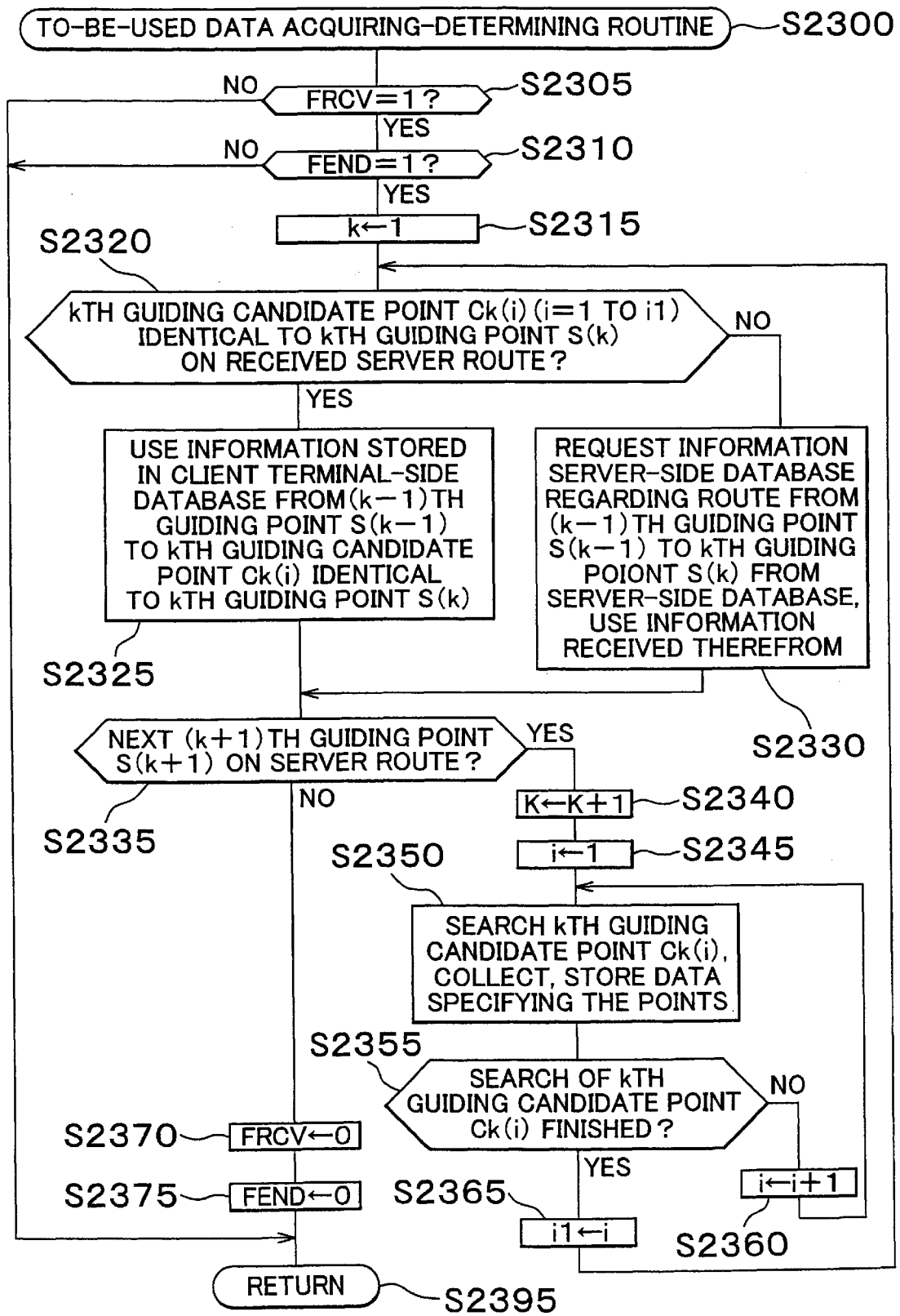
FIG. 23 is a flowchart which shows a to-be-used data acquiring-determining routine.

Furthermore, the client repeatedly executes a to-be-used data acquiring-determining routine illustrated in FIG. 23 at every elapse of a predetermined time. That is, at every elapse of the predetermined time, the client proceeds from step 2300 to step 2305, in which the client determines whether the value of the reception completion flag FRCV is "1". If the value of the reception completion flag FRCV is "0", the client determines "NO" in step 2305, and immediately proceeds to step 2395. Conversely, if the value of the reception completion flag FRCV is "1", the client determines "YES" in step 2305, and proceeds to step 2310. In step 2310, the client determines whether the value of the search end flag FEND is "1". If the value of the search end flag FEND is "0", the client determines "NO" in step 2310, and immediately proceeds to step 2395.

In other words, only if the client receives the server route guiding point information transmitted from the server and sets the reception completion flag FRCV at "1" in step 2110 in FIG. 21, and finishes the search of first guiding candidate points C1(i) and sets the value of the search end flag FEND at "1" in step 2240 in FIG. 22, the client proceeds to step 2315 via steps 2305 and 2310, and performs the processing that follows step 2315.

Description will be continued on the assumption that the client has received the server route guiding point information transmitted from the server and has finished the search of first guiding candidate points C1(i). Then, the client proceeds to step 2315 via steps 2300 to 2310. In step 2315, the client sets the value of a variable k at "1". Subsequently in step 2320, the client determines whether there is a kth guiding candidate point Ck(i) (i=1 to i1) identical to the kth guiding point S(k). In this case, since the value of the variable k is "1", the client determines whether the first guiding candidate points C1(i) (i=1 to i1) include a point identical to the first guiding point S(1).

It is determined that the kth guiding point S(k) is identical to a kth guiding candidate point Ck(i) if all the conditions (1) to (4) are met.

(1) The kth guiding point S(k) is identical to the kth guiding candidate point Ck(i) in position (latitude, longitude, altitude).

(2) The outgoing direction at the (k−1)th guiding point S(k−1) in the travel from the (k−1)th guiding point S(k−1) to the kth guiding point S(k) is the same as the outgoing direction at the (k−1)th guiding point S(k−1) in the travel from the (k−1)th guiding point S(k−1) to the kth guiding candidate point Ck(i).

(3) The incoming direction of income from the (k−1)th guiding point S(k−1) into the kth guiding point S(k) is the same as the incoming direction of income from the (k−1)th guiding point S(k−1) into the kth guiding candidate point Ck(i).

(4) The distance from the (k−1)th guiding point S(k−1) to the kth guiding point S(k) equals the distance from the (k−1)th guiding point S(k−1) to the kth guiding candidate point Ck(i).

It is also possible to include, as another condition for determining that the kth guiding point S(k) is identical to a kth guiding candidate point Ck(i), "(5) the road kind and the road property of the road (the type of road) from the (k−1)th guiding point S(k−1) to the kth guiding point S(k) are the same as the road kind and the road property of the road (the type of road) from the (k−1)th guiding point S(k−1) to the kth guiding candidate point Ck(i)." The conditions for determining that the kth guiding point S(k) is identical to a kth guiding candidate point Ck(i) may include the condition (1) as an essential condition combined with any one of the conditions (2) to (5) or at least two arbitrary conditions thereof.

If the kth guiding candidate points Ck(i) (i=1 to i1) includes a point Ck(m) identical to the kth guiding point S(k), the client proceeds to step 2325, in which the client determines that detailed information in the client-side database be used for the route navigation from the (k−1)th guiding point S(k−1) to the kth guiding point S(k) (i.e., the point Ck(m)). Thus, the route navigation regarding that segment is performed based on the detailed information stored in the client-side database. That is, since the value of the variable k is "1" in this case, the detailed information in the client-side database is used for the route navigation from the 0th guiding point (place of departure P) to the first guiding candidate point C1(m) identical to the first guiding point S(1).

Conversely, if the kth guiding candidate points Ck(i) (i=1 to i1) do not include a point identical to the kth guiding point S(k), the client proceeds from step 2320 to step 2330, in which the client determines that detailed information in the server-side database be used for the route navigation from the (k−1)th guiding point S(k−1) to the kth guiding point S(k). The client requests the server to provide detailed information regarding that segment. In accordance with the detailed information transmitted from the server in response to the request, the client performs the route navigation. That is, since the value of the variable k is "1" in this case, the detailed information in the server-side database is used for the route navigation from the 0th guiding point (place of departure P) to the first guiding point S(1).

After executing the processing of step 2325 or step 2330, the client proceeds to step 2335, in which the client determines whether the server route has a (k+1)th guiding point S(k+1), that is, the next guiding point. Since the present time point is subsequent to the determination of data to be used up to the first guiding point, it is normally the case that a plurality of guiding points exist. Therefore, the client determines "YES" in step 2335, and proceeds to step 2340, in which the client increases the value of the variable k by "1". Subsequently in step 2345, the client sets the value of the variable i at "1" again.

Subsequently, the client proceeds to step 2350, in which, as in step 2215, the client searches kth guiding candidate points Ck(i) with respect to the (k−1)th guiding point (i.e., adjacent guiding candidate points adjacent to the (k−1)th guiding point at the side toward the destination G) from the information stored in the client-side database, and collects data specifying the kth guiding candidate points, and stores the data into the internal memory of the client. Since the value of the variable k is "2" at the moment, the search, data collection and data storage regarding the second guiding candidate points C2(i) is performed.

Subsequently, the client proceeds to step 2355, in which the client determines whether the search of kth guiding candidate points Ck(i) has ended. If the search has not ended, the client increases the value of the variable i by "1" in step 2360, and goes back to step 2350. When the search of kth guiding candidate points Ck(i) has ended, the client determines "YES" in step 2355, and proceeds to step 2365, in which the client stores the present value of the variable i as a storage value i1. Subsequently, the client goes back to step 2320 again, and then executes step 2325 or step 2330 in accordance with the result of step 2320. In this manner, the client determines which one of the detailed information from the client-side database and the detailed information from the server-side database be used for the route navigation from the (k−1)th guiding point S(k−1) to the kth guiding point S(k) and, if necessary, requests the server to provide the detailed information for that segment and receives the information from the server.

If the client requests detailed information for the aforementioned route segment from the server, the server transmits the detailed information from the server-side database by executing steps 2005 to step 2015 illustrated in FIG. 20. That is, after executing step 515, the server determines whether there is a request from the client for detailed information for the route segment between the predetermined guiding points before the elapse of the predetermined time (steps 2005, step 2015). If such a request is received, the server transmits to the client the detailed information in the server-side database corresponding to the request in step 2010.

When acquisition of the data used up to the destination G is completed through repetitions of the above-described process, the client determines "NO" in step 2335, and proceeds to step 2370. In step 2370, the client sets the value of the reception completion flag FRCV at "0". Subsequently in step 2375, the client sets the value of the search end flag FEND at "0". In step 2395, the client ends the routine.

According to the third embodiment, the client searches first guiding candidate points, and collects and stores data regarding the first guiding candidate points, by using the time consumed by the server to calculate a server route. Therefore, when the client receives guiding point information of the server route, the client does not need to search for a route from the place of departure P to a first guiding candidate point, but is able to immediately determine which one of the client-side database and the server-side database contains information that can be used for the route segment. As a result, it becomes possible to start the route navigation from the place of departure P to the first guiding point within a short time.

With regard to the second, third, . . . , nth guiding points as well as the first guiding point, the client specifies a corresponding guiding candidate point by searching and collecting information from client-side database, and determines usable information based on whether there is a guiding point identical to the guiding point on the server route. Therefore, the client does not need to perform a time-consuming route calculation, and is able to determine and acquire usable information within a short time, and is therefore able to perform route navigation appropriate to users.

In the third embodiment, the client searches information only regarding first guiding candidate points before the time point of acquiring guiding point information from the server. However, if the search of information regarding the first guiding candidate points ends before the time point, the client may further perform search of information regarding second guiding candidate points with reference to the first guiding candidate points, and third guiding candidate points with reference to the second guiding candidate points, and so on, sequentially before the time point of acquiring the guiding point information from the server.

As described above, according to the exemplary embodiments of the invention, the identical information in the client terminal database and the server database is detected based on the guiding point information which is transferred in small size data via communication, and the detected identical information in the client terminal database is effectively used and thereby the amount of the information to be transmitted to the client terminal from the server is decreased.

The invention is not limited to the embodiments described above. For example, though, in the above-described embodiments, the identicalness or non-identicalness of the guiding point is determined based on the identicalness of the respective items such as position, distance, outgoing/incoming directions and the like, in another embodiment, the guiding points may be determined to be identical not only when values of the respective items are completely the same but also when those values are different but not exceeding certain tolerances (i.e., they are substantially the same).

Further, although in the above-described embodiments, the identicalness between the server route and the client route is determined based on the identicalness of the items such as the position of the guiding point, the distance between the adjoining guiding points, the outgoing/incoming directions, the road type of the road between the adjoining guiding points and the like, in another embodiment, the identicalness between the server route and the client route may be determined based on the identicalness of one or more arbitrary item(s) among those (e.g., position only, combination of position and outgoing/incoming directions, position and distance between adjoining guiding points, position and road type between adjoining guiding points, position, incoming/outgoing directions and road type, and the like).

Further, by using a rewritable data storage device such as a hard drive as the client terminal database (external memory 16), it becomes possible to record the data concerning the route, transmitted from the base, in the client terminal database. This provides an advantage that, using the recorded data in the next route navigation, data transmission load of the base is decreased.

When a memory such as a hard-disk which can change read-in memory is used for the client terminal database (the external memory 16), a route sent from the information center can be memorized in the database. In this case, since the memorized data can be used when a search of the route is executed in the next time, the sending load of the center can be reduced.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A route navigation system which performs a route navigation for a user of a client terminal from a place of departure to a destination, comprising:

a server that includes a server database and determines a server route, which is a route from the place of departure to the destination, along with guiding points using information in the server database; and the client terminal that includes a client terminal database, communicates with the server and determines a client route, which is a route from the place of departure to the destination, along with guiding points using information in the client terminal database; wherein at least one of the server and the client terminal determines identicalness, which is whether or not a route between adjoining guiding points of the server route and a route between adjoining guiding points of the client route are identical by comparing at least positions of the guiding points of the server route and positions of the guiding points of the client route, and the client terminal, according to a result of the identicalness determination, selectively uses information concerning the server route in the server database and information concerning the client route in the client terminal database in performing the route navigation.

2. A route navigation system according to claim 1, wherein in the identicalness determination, at least a position of an outgoing-side guiding point of the adjoining guiding points of the server route and a position of an outgoing-side guiding point of the adjoining guiding points of the client route, and a position of an incoming-side guiding point of the adjoining guiding points of the server route and a position of an incoming-side guiding point of the adjoining guiding points of the client route are respectively compared to determine whether or not the route between the adjoining guiding points of the server route and the route between the adjoining guiding points of the client route are identical, and the client terminal, if the route between the adjoining guiding points of the server route and the route between the adjoining guiding points of the client route are determined to be identical, performs the route navigation of the route between the adjoining guiding points using the information in the client terminal database.

3. A route navigation system according to claim 2, wherein in the identicalness determination, an outgoing direction from the outgoing-side guiding point of the server route and an outgoing direction from the outgoing-side guiding point of the client route, and an incoming direction to the incoming-side guiding point of the server route and an incoming direction to the incoming-side guiding point of the client route also are respectively compared to determine whether or not the route between the adjoining guiding points of the server route and the route between the adjoining guiding points of the client route are identical.

4. A route navigation system according to claim 2, wherein in the identicalness determination, a distance of the server route between the adjoining guiding points and a distance of the client route between the adjoining guiding points are compared to determine whether or not the route between the adjoining guiding points of the server route and the route between the adjoining guiding points of the client route are identical.

5. A route navigation system according to claim 2, wherein in the identicalness determination, road type of a road between the adjoining guiding points of the server route and road type of a road between the adjoining guiding points of the client route are compared to determine whether or not the route between the adjoining guiding points of the server route and the route between the adjoining guiding points of the client route are identical.

6. A route navigation system according to claim 2, wherein in the identicalness determination, a guiding point of the client route which adjoins a guiding point thereof that is identical with a guiding point of the server route and which is not identical with any guiding point of the server route is searched for in the server route, and if it is determined that the non-identical guiding point of the client route exists in the server route in the search, the route navigation of a route between the guiding point of the client route identical with the guiding point of the server route and the non-identical guiding point of the client route is performed using the information in the client terminal database.

7. A route navigation system according to claim 2, wherein in the identicalness determination, a guiding point of the server route which adjoins a guiding point thereof that is identical with a guiding point of the client route and which is not identical with any guiding point of the client route is searched for in the client route, and if it is determined that the non-identical guiding point of the server route exists in the client route in the search, the route navigation of a route between the guiding point of the server route identical with the guiding point of the client route and the non-identical guiding point of the server route is performed using the information in the client terminal database.

8. A route navigation system which performs a route navigation for a user of a client terminal from a place of departure to a destination, comprising:

a server that includes a server database and determines a server route, which is a route from the place of departure to the destination, along with guiding points using information in the server database; and a client terminal that includes a client terminal database, communicates with the server and determines a client route, which is a route from the place of departure to the destination, along with guiding points using information in the client terminal database, wherein the client terminal obtains information concerning guiding points of the determined server route from the server and, taking one of adjoining guiding points specified in the obtained information concerning the guiding points as an outgoing-side guiding point, and the other one of the adjoining guiding points as an incoming-side guiding point, determines the client route therebetween using the information in the client terminal database, and the client terminal determines whether or not the server route between the adjoining guiding points and the determined client route are identical, and if identical, the client terminal performs the route navigation of a route between the adjoining guiding points using the information in the client terminal database, and if not identical, the client terminal obtains information concerning one or more sections or entire sections of the route between the adjoining guiding points from the server and performs the route navigation of the route between the adjoining guiding points based on the obtained information.

9. A route navigation system according to claim 8, wherein the client terminal determines that the server route between the adjoining points and the determined client route are identical at least when there exists no intermediate guiding point other than the outgoing-side guiding point and the incoming-side guiding point in the determined client route, and a distance of the determined client route and a distance of the server route between the adjoining guiding points are identical.

10. A route navigation system according to claim 9, wherein the client terminal, if the other intermediate guiding point exists in the determined client route, transmits information concerning the other intermediate guiding point, and the incoming-side guiding point or the outgoing-side guiding point which adjoins the other intermediate guiding point to the server, and the server, according to the information transmitted from the client terminal, determines whether or not a route from the other intermediate guiding point to the incoming-side guiding point or the outgoing-side guiding point which adjoins the other intermediate guiding point exists in the server route based on the information in the server database, and according to a result of the determination, transmits information concerning the route from the other intermediate guiding point to the incoming-side guiding point or the outgoing-side guiding point which adjoins the other intermediate guiding point to the client terminal.

11. A route navigation system according to claim 8, wherein the client terminal determines that the server route between the adjoining points and the determined client route are identical at least when there exists no intermediate guiding point other than the outgoing-side guiding point and the incoming-side guiding point in the determined client route and a distance of the determined client route and a distance of the server route between the adjoining guiding points are identical, and a road type of the determined client route and a road type of the server route between the adjoining guiding points are identical.

12. A route navigation system according to claim 11, wherein the client terminal, if the other intermediate guiding point exists in the determined client route, transmits information concerning the other intermediate guiding point, and the incoming-side guiding point or the outgoing-side guiding point which adjoins the other intermediate guiding point to the server, and the server, according to the information transmitted from the client terminal, determines whether or not a route from the other intermediate guiding point to the incoming-side guiding point or the outgoing-side guiding point which adjoins the other intermediate guiding point exists in the server route based on the information in the server database, and according to a result of the determination, transmits information concerning the route from the other intermediate guiding point to the incoming-side guiding point or the outgoing-side guiding point which adjoins the other intermediate guiding point to the client terminal.

13. A client terminal which, communicating with a server which determines a server route which is a route from a place of departure to a destination along with guiding points using information in a server database, performs route navigation for a user from the place of departure to the destination, comprising:

a client terminal database; and a controller that determines a client route which is a route from the place of departure to the destination using information in the client terminal database and that performs the route navigation, selectively using the information in the server-database concerning the server route and the information in the client terminal database concerning the client route based on identicalness or non-identicalness between a route between adjoining guiding points of the server route and a route between adjoining guiding points of the client route, determined by comparing a position of a guiding point of the server route and a position of a guiding point of the client route.

14. A client terminal according to claim 13, wherein the controller respectively compares a position of an outgoing-side guiding point of the server route and a position of an outgoing-side guiding point of the client route, and a position of an incoming-side guiding point of the server route which adjoins the outgoing-side guiding point thereof and a position of an incoming-side guiding point of the client route which adjoins the outgoing-side guiding point thereof, and thereby determines whether or not a route between the outgoing-side guiding point and the incoming-side guiding point of the server route and a route between the outgoing-side guiding point and the incoming-side guiding point of the client route are identical, and performs the route navigation of a route in a section wherein the routes are determined to be identical, using the information in the client terminal database.

15. A client terminal according to claim 14, wherein the controller further compares an outgoing direction from the outgoing-side guiding point of the server route and an outgoing direction from the outgoing-side guiding point of the client route, and an incoming direction to the incoming-side guiding point of the server route and an incoming direction to the incoming-side guiding point of the client route respectively, and thereby determines whether or not the route between the outgoing-side guiding point and the incoming-side guiding point of the server route and the route between the outgoing-side guiding point and the incoming-side guiding point of the client route are identical, and performs the route navigation of the route in the section wherein the routes are determined to be identical, using the information in the client terminal database.

16. A client terminal according to claim 15, wherein the controller further compares a distance of the server route between the outgoing-side guiding point and the incoming-side guiding point and a distance of the client route between the outgoing-side guiding point and the incoming-side guiding point, and thereby determines whether or not the route between the outgoing-side guiding point and the incoming-side guiding point of the server route and the route between the outgoing-side guiding point and the incoming-side guiding point of the client route are identical, and performs the route navigation of the route in the section where the routes are determined to be identical, using the information in the client terminal database.

17. A client terminal according to claim 16, wherein the controller further compares a road type of a road between the outgoing-side guiding point and the incoming-side guiding point of the server route and a road type of a road between the outgoing-side guiding point and the incoming-side guiding point of the client route, and thereby determines whether or not the route between the outgoing-side guiding point and the incoming-side guiding point of the server route and the route between the outgoing-side guiding point and the incoming-side guiding point of the client route are identical, and performs the route navigation of the route in the section wherein the routes are determined to be identical, using the information in the client terminal database.

18. A client terminal according to claim 14, wherein
when a guiding point of the client route which adjoins a guiding point thereof identical with a guiding point of the server route and which is not identical with any guiding point of the server route exists in the server route, the controller performs the route navigation of a route between the guiding point of the client route identical with the guiding point of the server route and the non-identical guiding point using the information in the client terminal database.

19. A client terminal according to claim 14, wherein
when a guiding point of the server route which adjoins a guiding point thereof identical with a guiding point of the client route and which is not identical with any guiding point of the client route exists in the client route, the controller performs the route navigation of a route between the guiding point of the server route identical with the guiding point of the client route and the non-identical guiding point using the information in the client terminal database.

20. A client terminal which, communicating with a server which determines a server route which is a route from a place of departure to a destination using information in a server database, performs route navigation for a user from the place of departure to the destination, comprising:
 a client terminal database; and
 a controller that obtains information concerning guiding points of the determined server route from the server and, taking one of adjoining guiding points specified in the obtained information concerning the guiding points as an outgoing-side guiding point and the other one of the adjoining guiding points as an incoming-side guiding point, determines a client route therebetween using information in the client terminal database; and
 the controller further determines whether or not the server route between the adjoining guiding points and the determined client route are identical, and, if identical, the controller performs the route navigation of a route between the adjoining guiding points using the information in the client terminal database, and, if not identical, the controller obtains information concerning one or more sections or entire sections of the route between the adjoining guiding points from the server and performs the route navigation of the route between the adjoining guiding points based on the obtained information.

21. A client terminal according to claim 20, wherein
the controller determines that the server route between the adjoining points and the determined client route are identical at least when there exists no intermediate guiding point other than the outgoing-side guiding point and the incoming-side guiding point in the determined client route and a distance of the determined client route and a distance of the server route between the adjoining guiding points are identical.

22. A client terminal according to claim 21, wherein
when there exists an intermediate guiding point other than the outgoing-side guiding point and the incoming-side guiding point in the client route and the other intermediate guiding point and a route from the other intermediate guiding point to the incoming-side guiding point, or the outgoing-side guiding point which adjoins the other intermediate guiding point exist in the server route, the controller performs the route navigation of the route which exists in the server route using the information in the client terminal database.

23. A client terminal according to claim 21, wherein
the controller further determines that the server route between the adjoining guiding points and the determined client route are identical when a road type of the client route and a road type of the server route between the adjoining guiding points are identical.

24. A client terminal according to claim 23, wherein
when there exists the other intermediate guiding point in the determined client route and the other intermediate guiding point and the route from the other intermediate guiding point to the incoming-side guiding point or the outgoing-side guiding point which adjoins the other intermediate guiding point exist in the server route, the controller performs the route navigation of the route which exists in the server route using the information in the client terminal database.

25. A server that communicates with a client terminal that determines a client route which is a route from a place of departure to a destination of a user along with guiding points and which performs route navigation of the route from the place of departure to the destination selectively using information in a client terminal database concerning the determined client route and information received from the client terminal database, comprising:
 a server database;
 a controller that determines a server route which is a route from the place of departure to the destination along with guiding points using information in the server database; and
 a transmitter that transmits information concerning one or more sections or entire sections of the server route to the client terminal based on a comparison between a position of the guiding point of the server route and a position of the guiding point of the client route.

26. A route navigation method, in which a server having a server database, and a client terminal having a client terminal database, communicate with each other in performing route navigation for a user of the client terminal from a place of departure to a destination, comprising the steps of:
 determining whether or not a route between adjoining guiding points of a server route which is a route from the place of departure to the destination determined using information in the server database, and a route between adjoining guiding points of a client route which is a route from the place of departure to the destination determined using information in the client terminal database, are identical by at least comparing a position of the guiding point of the server route and a position of the guiding point of the client route; and
 performing the route navigation, selectively using information in the server database concerning the server route and information in the client database concerning the client route based on a result of the comparison.

27. A route identicalness determination method, which determines whether or not server route data including information concerning guiding points, determined by a server having a server database using information therein, and client route data including information concerning guiding points, determined by a client terminal having a client terminal database using information therein, are identical, comprising the steps of:
 determining whether or not a position of an outgoing-side guiding point of the server route and a position of an outgoing-side guiding point of the client route are identical;
 determining whether or not a position of an incoming-side guiding point of the server route which adjoins the outgoing-side guiding point thereof and a position of an incoming-side guiding point of the client route which adjoins the outgoing-side guiding point thereof are identical; and determining that the route datum are identical when both of the determinations are satisfied.

28. A route identicalness determination method according to claim 27, further comprising the step of:

determining whether or not an incoming direction to the incoming-side guiding point of the server route and an incoming direction to the incoming-side guiding point of the client route are identical, and wherein the route datum are determined to be identical when all three of the determinations are satisfied.

29. A route identicalness determination method according to claim 27, further comprising the step of:

determining whether or not a distance between the outgoing-side guiding point and the incoming-side guiding point of the server route and a distance between the outgoing-side guiding point and the incoming-side guiding point of the client route are identical, and wherein the route datum are determined to be identical when all three of the determinations are satisfied.

30. A route identicalness determination method according to claim 27, further comprising the step of:

determining whether or not a road type of a road between the outgoing-side guiding point and the incoming-side guiding point of the server route and a road type of a road between the outgoing-side guiding point and the incoming-side guiding point of the client route are identical, and wherein the route datum are determined to be identical when all three of the determinations are satisfied.

31. A route navigation system which performs a route navigation for a user of a client terminal from a place of departure to a destination, comprising:

a server that includes a server-side database, determines a server route, which is a route from the place of departure to the destination using information in the server-side database based on information for specifying the place of departure and the destination which information is transmitted from the client terminal, and transmits information regarding a guiding point included in the server route obtained to the client terminal; and the client terminal that transmits at least the information for specifying the place of departure and the destination to the server, obtains a point that can be a first guiding point that is a guiding point adjacent to the place of departure as a first guiding candidate point by searching information stored in a client terminal-side database, and receives information regarding the guiding point of the server route obtained and determines whether the first guiding candidate point includes a point identical to the first guiding point specified by the received information regarding the guiding point of the server route, and performes the route navigation regarding a segment from the place of departure to the first guiding point using the information stored in the client terminal-side database if there is a first guiding candidate point identical to the first guiding point, and performs the route navigation by acquiring information regarding a segment from the place of departure to the first guiding point from the server if there is not a first guiding candidate point identical to the first guiding point, wherein the route navigation is performed while the information from the server-side database and the information from the client terminal-side database are selectively used.

32. A client terminal which communicates with a server that has a server-side database, determines a server route which is a route from the place of departure to the destination using information stored in the server-side database when information specifying a place of departure and a destination is given, and transmits information regarding a guiding point included in the server route obtained to an external device, and which performs a route navigation for a user from the place of departure to the destination, the client terminal comprising:

a client terminal-side database; and a controller that transmits at least information specifying the place of departure and the destination to the server, obtains a point that can be a first guiding point that is a guiding point adjacent to the place of departure as a first guiding candidate point by searching information stored in the client terminal-side database, acquires information regarding a guiding point of the obtained server route through transmission from the server, determines whether the obtained first guiding candidate point includes a point identical to the first guiding point specified by the acquired information regarding the guiding point of the server route, and performs the route navigation regarding a segment from the place of departure to the first guiding point using the information stored in the client terminal-side database if it is determined that there is a first guiding candidate point identical to the first guiding point, and for performing the route navigation by acquiring information regarding a segment from the place of departure to the first guiding point from the server if it is determined that there is not a first guiding candidate point identical to the first guiding point.

33. A client terminal according to claim 32, wherein the controller determines whether a position of the first guiding point is the same as a position of the first guiding candidate point.

34. A client terminal according to claim 33, wherein the controller further performs at least one of a determination as to whether an incoming direction into the first guiding point is the same as an incoming direction into the first guiding candidate point, a determination as to whether an outgoing direction from the place of departure toward the first guiding point is the same as an outgoing direction from the place of departure toward the first guiding candidate point, a determination as to whether a distance between the place of departure and the first guiding point is the same as a distance between the place of departure and the first guiding candidate point, and a determination as to whether a type of a road between the place of departure and the first guiding point is the same as a type of a road between the place of departure and the first guiding candidate point.

35. A route navigation system which performs a route navigation for a user of a client terminal from a place of departure to a destination, comprising:

a server that determines a server route that is a route from the place of departure to the destination using information stored in a server-side database based on information for specifying the place of departure and the destination which information is transmitted from the client terminal and transmits guiding point information regarding a guiding point included in the server route obtained to the client terminal; and the client terminal that transmits at least the information for specifying the place of departure and the destination to the server, acquires the guiding point information of the server route from the server, obtains a point that can be an adjacent guiding point that is a guiding point adjacent to an arbitrary guiding point of guiding points specified by the acquired guiding point information, at a destination side of the arbitrary guiding point, as an adjacent guiding candidate point by searching information stored in a client terminal-side database, determines whether the adjacent guiding candidate point includes a point identical to an adjacent guiding point of the server route which is a guiding point adjacent to the destination side of the arbitrary guiding point and which is specified by the acquired guiding point information, performs the route navigation regarding a segment from the arbitrary guiding point to the adjacent guiding point of the server route using the information stored in the client terminal-side database if there is an adjacent guiding candidate point identical to the adjacent guiding point of the server route, and performs the route navigation by acquiring information regarding a segment from the arbitrary guiding point to the adjacent guiding point of the server route from the server if there is not an adjacent guiding candidate point identical to the adjacent guiding point of the server route, wherein the route navigation is performed while the information from the server-side database and the information from the client terminal-side database are selectively used.

36. A client terminal which communicates with a server that has a server-side database, determines a server route which is a route from the place of departure to the destination using information stored in the server-side database when information specifying a place of departure and a destination is given, and performs a route navigation for a user from the place of departure to the destination, the client terminal comprising:

a client terminal-side database; and a controller that transmits at least information specifying the place of departure and the destination to the server, searching guiding point information regarding a guiding point of the obtained server route, obtaining a point that can be an adjacent guiding point that is a guiding point adjacent to an arbitrary guiding point of guiding points specified by the received guiding point information, at a destination side of the arbitrary guiding point, as an adjacent guiding candidate point by searching information stored in a client terminal-side database, determining whether the adjacent guiding candidate point includes a point identical to an adjacent guiding point of the server route which is a guiding point adjacent to the destination side of the arbitrary guiding point and which is specified by the received guiding point information, and performs the route navigation regarding a segment from the arbitrary guiding point to the adjacent guiding point of the server route using the information stored in the client terminal-side database if there is an adjacent guiding candidate point identical to the adjacent guiding point of the server route and performs the route navigation by acquiring information regarding a segment from the arbitrary guiding point to the adjacent guiding point of the server route from the server if there is not an adjacent guiding candidate point identical to the adjacent guiding point of the server route.

* * * * *